United States Patent
Wilson

(10) Patent No.: US 11,346,198 B2
(45) Date of Patent: May 31, 2022

(54) FRACTURING OF A WET WELL UTILIZING AN AIR/FUEL MIXTURE

(71) Applicant: Twin Disc, Inc., Racine, WI (US)

(72) Inventor: Edwin E. Wilson, Colleyville, TX (US)

(73) Assignee: Twin Disc, Inc., Racine, WI (US)

( * ) Notice: Subject to any disclaimer, the term of this patent is extended or adjusted under 35 U.S.C. 154(b) by 0 days.

(21) Appl. No.: 17/122,729

(22) Filed: Dec. 15, 2020

(65) Prior Publication Data

US 2021/0277759 A1 Sep. 9, 2021

Related U.S. Application Data

(63) Continuation-in-part of application No. 16/552,761, filed on Aug. 27, 2019, now Pat. No. 10,865,630, which is a continuation of application No. 15/736,503, filed as application No. PCT/US2016/037887 on Jun. 16, 2016, now Pat. No. 10,392,915.

(60) Provisional application No. 62/180,473, filed on Jun. 16, 2015.

(51) Int. Cl.
*E21B 43/263* (2006.01)
*C09K 8/62* (2006.01)
*C09K 8/66* (2006.01)
*C09K 8/80* (2006.01)
*E21B 43/248* (2006.01)

(52) U.S. Cl.
CPC .............. *E21B 43/263* (2013.01); *C09K 8/62* (2013.01); *C09K 8/665* (2013.01); *C09K 8/80* (2013.01); *E21B 43/248* (2013.01)

(58) Field of Classification Search
None
See application file for complete search history.

(56) References Cited

U.S. PATENT DOCUMENTS

| | | | |
|---|---|---|---|
| 3,075,463 A | 1/1963 | Eilers et al. |
| 3,336,982 A | 8/1967 | Woodward et al. |
| 4,360,062 A | 11/1982 | Browning |
| 5,346,015 A | 9/1994 | Grundmann |
| 5,402,846 A | 4/1995 | Jennings, Jr. et al. |

(Continued)

FOREIGN PATENT DOCUMENTS

| WO | 2013081609 A1 | 6/2013 |
|---|---|---|
| WO | 2013151604 A1 | 10/2013 |
| WO | 2013154628 A1 | 10/2013 |

*Primary Examiner* — Andrew Sue-Ako
(74) *Attorney, Agent, or Firm* — Boyle Fredrickson S.C.

(57) ABSTRACT

A method of producing subterranean fractures in geologic formations having a significant amount of water present (a wet well) for the extraction of hydrocarbons therefrom includes flowing an explosive hydrophobic emulsion mixture to protect the air and fuel mixture subsequently flowed into a well hole. The well hole may then be sealed with a packer plug creating a compression chamber with the air and fuel mixture. A liquid, such as water, may be pumped into the well hole to create pressure in the compression chamber. The build-up of pressure eventually causes auto-ignition of the air and fuel mixture which fractures the formation. The water may then rush into the compression chamber which thermally shocks the area causing additional fractures. The water may vaporize to steam and thoroughly disinfect the well hole eliminating the need for added biocides.

20 Claims, 16 Drawing Sheets

(56) References Cited

U.S. PATENT DOCUMENTS

| | | | |
|---|---|---|---|
| 7,243,725 B2 | 7/2007 | George et al. | |
| 7,980,312 B1 * | 7/2011 | Hill | E21B 43/24 |
| | | | 166/303 |
| 8,261,823 B1 | 9/2012 | Hill et al. | |
| 8,869,889 B2 | 10/2014 | Palmer et al. | |
| 10,392,915 B2 * | 8/2019 | Wilson | C09K 8/62 |
| 10,865,630 B2 * | 12/2020 | Wilson | E21B 43/248 |
| 2007/0204991 A1 | 9/2007 | Loree et al. | |
| 2009/0050319 A1 | 2/2009 | Kaminsky et al. | |
| 2013/0032337 A1 | 2/2013 | Rytlewski et al. | |
| 2013/0161007 A1 | 6/2013 | Wolfe et al. | |
| 2014/0262249 A1 | 9/2014 | Willberg et al. | |

* cited by examiner

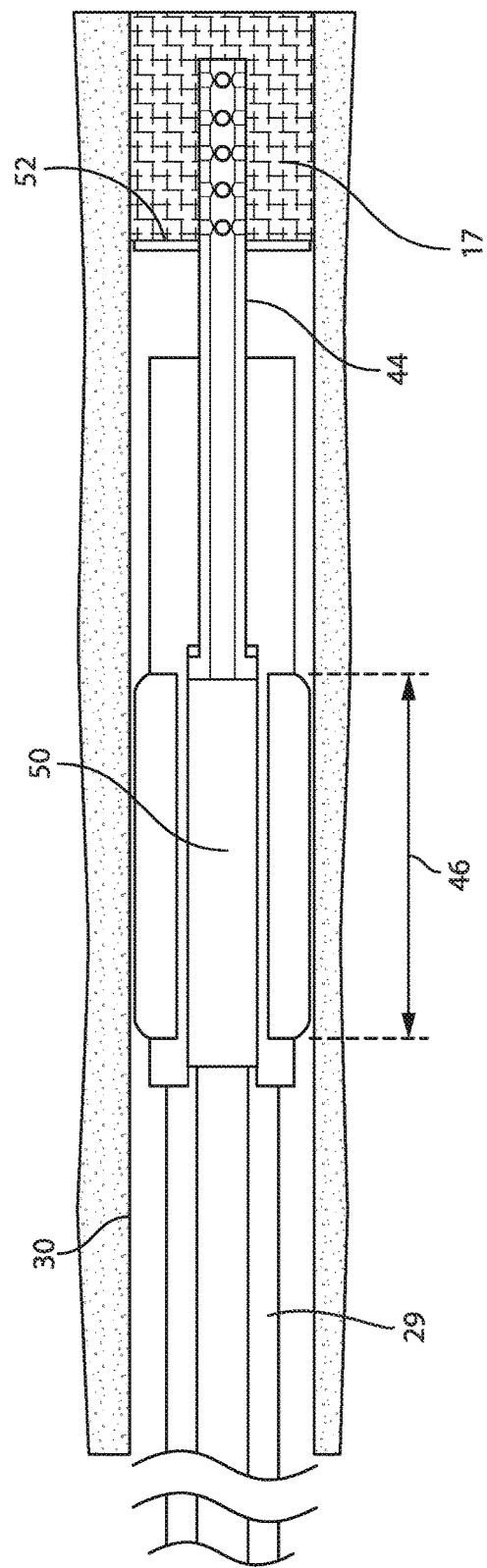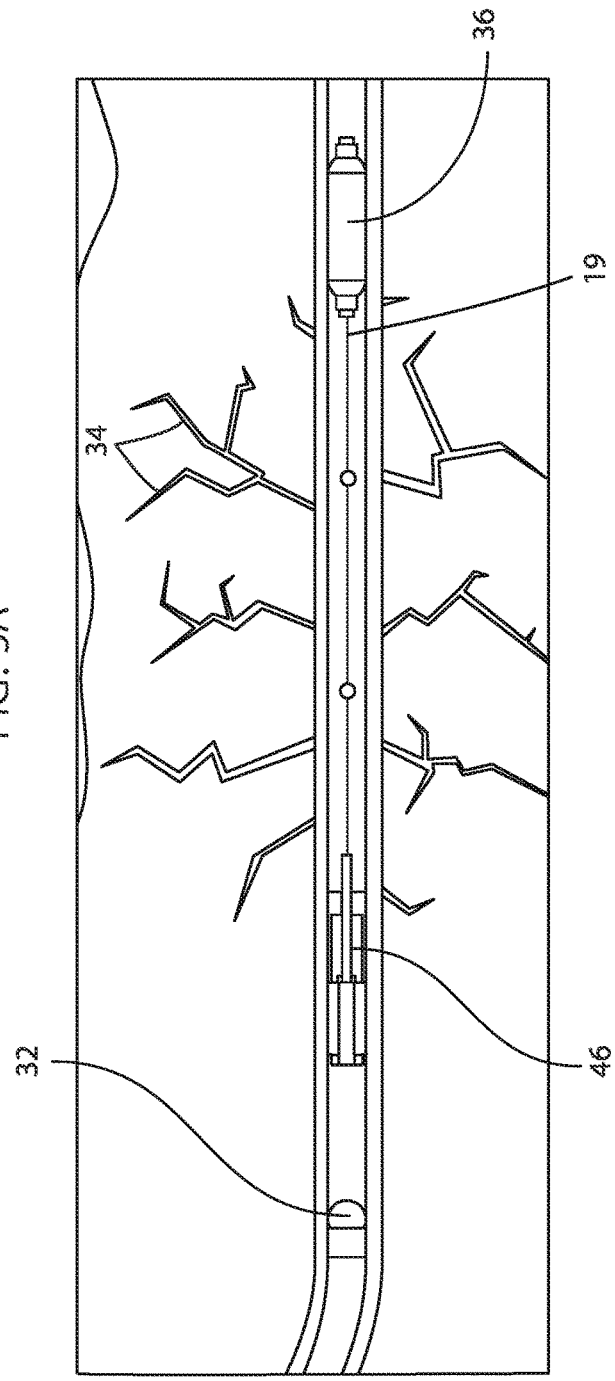

US 11,346,198 B2

FRACTURING OF A WET WELL UTILIZING AN AIR/FUEL MIXTURE

CROSS-REFERENCE TO RELATED APPLICATION

This application is a continuation-in-part of U.S. Non-Provisional patent application Ser. No. 16/552,761 (and issued as U.S. Pat. No. 10,865,630), which is a continuation of U.S. Non-Provisional patent application Ser. No. 15/736,503, filed Dec. 14, 2017 (and issued as U.S. Pat. No. 10,392,915 on Aug. 27, 2019), which is a national phase application of PCT/US2016/037887, filed Jun. 16, 2016, which claims priority to U.S. Provisional Patent Application No. 62/180,473, filed on Jun. 16, 2015, the entirety of each of which is expressly incorporated by reference herein.

BACKGROUND OF THE INVENTION

1. Field of the Invention

The preferred embodiments relate generally to the field of hydrocarbon recovery from the earth, and more specifically, to fracturing underground formations for the recovery of hydrocarbons using a method of fracturing the formations with the use of an auto-igniting air and fuel mixture and an emulsion mixture when water is present in the well.

2. Discussion of the Related Art

Fracturing as a method to stimulate shallow, hard rock oil wells dates back to the 1860s. Dynamite or nitroglycerin detonations were used to increase oil and natural gas production from petroleum bearing formations. On Apr. 25, 1865, Civil War veteran Col. Edward A. L. Roberts received a patent for a Torpedo with U.S. Pat. No. 47,458. Stimulation of wells with acid, instead of explosive fluids, was introduced in the 1930s.

The relationship between well performance and treatment pressures was studied as far back as 1947 where 1,000 US gallons of gelled gasoline (essentially napalm) and sand from the Arkansas River was injected into the gas-producing limestone formation at 2,400 feet (730 m). The experiment was not very successful as deliverability of the well did not change appreciably. The Halliburton company is known to have performed the first two commercial hydraulic fracturing treatments in Stephens County, Okla., and Archer County, Tex. Since then, hydraulic fracturing has been used to stimulate approximately one million oil and gas wells in various geologic regimes.

American geologists became increasingly aware that there were huge volumes of gas-saturated sandstones with permeability too low (generally less than 0.1 millidarcy) to recover the gas economically. Starting in 1973, massive hydraulic fracturing was used in thousands of gas wells in the San Juan Basin, Denver Basin, the Piceance Basin, the Green River Basin, and in other hard rock formations of the western US. Other tight sandstone wells in the US made economically viable by massive hydraulic fracturing were in the Clinton-Medina Sandstone, and Cotton Valley Sandstone.

Horizontal oil or gas wells were unusual until the late 1980s. Then, operators in Texas began completing thousands of oil wells by drilling horizontally in the Austin Chalk, and giving massive slickwater hydraulic fracturing treatments to the wellbores. Horizontal wells proved much more effective than vertical wells in producing oil from tight chalk; sedimentary beds are usually nearly horizontal, so horizontal wells have much larger contact areas with the target formation.

Due to shale's low permeability, technological research, development and demonstration were necessary before hydraulic fracturing was accepted for commercial application to shale gas deposits. In 1976, the United States government started the Eastern Gas Shales Project, a set of dozens of public-private hydraulic fracturing demonstration projects. During the same period, the Gas Research Institute, a gas industry research consortium, received approval for research and funding from the Federal Energy Regulatory Commission.

In 1997, taking the slickwater fracturing technique used in East Tex. by Union Pacific Resources (now part of Anadarko Petroleum Corporation), Mitchell Energy (now part of Devon Energy), applied the technique in the Barnett Shale of north Tex. This made gas extraction widely economical in the Barnett Shale, and was later applied to other shales. The first horizontal well in the Barnett Shale was drilled in 1991, but was not widely done in the Barnett until it was demonstrated that gas could be economically extracted from vertical wells in the Barnett.

According to the United States Environmental Protection Agency (EPA), hydraulic fracturing is a process to stimulate a natural gas, oil, or geothermal energy well to maximize extraction. The EPA defines the broader process as including the acquisition of source water, well construction, well stimulation, and waste disposal.

A hydraulic fracture is formed by pumping fracturing fluid into a wellbore at a rate sufficient to increase pressure at the target depth (determined by the location of the well casing perforations), to exceed that of the fracture gradient (pressure gradient) of the rock formation. The fracture gradient is defined as pressure increase per unit of depth relative to density, and is usually measured in pounds per square inch, per foot, or bars per metre. The rock formation cracks, and the fracture fluid permeates the rock extending the crack further, and further, and so on. Fractures are localized as pressure drops off with the rate of frictional loss, which is relevant to the distance from the well. Operators typically try to maintain "fracture width", or slow its decline following treatment, by introducing a proppant into the injected fluid (a material such as grains of sand, ceramic, or other particulate, thus preventing the fractures from closing when injection is stopped and pressure removed). Consideration of proppant strength and prevention of proppant failure becomes more important at greater depths where pressure and stresses on fractures are higher. The propped fracture is permeable enough to allow the flow of gas, oil, salt water and hydraulic fracturing fluids to the well.

During the process, fracturing fluid leakoff (loss of fracturing fluid from the fracture channel into the surrounding permeable rock) occurs. If not controlled, it can exceed 70% of the injected volume. This may result in formation matrix damage, adverse formation fluid interaction, and altered fracture geometry, thereby decreasing efficiency.

The location of one or more fractures along the length of the well hole is preferably strictly controlled by various methods that create or seal holes in the side of the wellbore. Hydraulic fracturing is performed in cased wellbores, and the zones to be fractured are accessed by perforating the casing at those locations.

Hydraulic-fracturing equipment used in oil and natural gas fields usually consists of a slurry blender, one or more high-pressure, high-volume fracturing pumps (typically powerful triplex or quintuplex pumps) and a monitoring unit. Associated equipment includes fracturing tanks, one or more units for storage and handling of proppant, high-pressure treating iron, a chemical additive unit (used to accurately monitor chemical addition), low-pressure flexible hoses, and many gauges and meters for flow rate, fluid density, and treating pressure. Chemical additives are typically 0.5% percent of the total fluid volume. Fracturing equipment operates over a range of pressures and injection rates, and can reach up to 100 megapascals (15,000 psi) and 265 litres per second (9.4 cu ft/s) (100 barrels per minute).

The fracturing fluid varies depending on fracturing type desired, and the conditions of specific wells being fractured, and water characteristics. The fluid can be gel, foam, or slickwater-based. Fluid choices include tradeoffs: more viscous fluids, such as gels, are better at keeping proppant in suspension; while less-viscous and lower-friction fluids, such as slickwater, allow fluid to be pumped at higher rates, to create fractures farther out from the wellbore. Important material properties of the fluid include viscosity, pH, various rheological factors, and others.

The water brought in is mixed with sand and chemicals to create fracking fluid. Approximately 40,000 gallons of chemicals are used per fracturing. A typical fracture treatment uses between 3 and 12 additive chemicals. Although there may be unconventional fracturing fluids, typical chemical additives can include one or more of the following:

Acids—hydrochloric acid or acetic acid is used in the pre-fracturing stage for cleaning the perforations and initiating fissure in the near-wellbore rock.

Sodium chloride (salt)—delays breakdown of gel polymer chains.

Polyacrylamide and other friction reducers decrease turbulence in fluid flow and pipe friction, thus allowing the pumps to pump at a higher rate without having greater pressure on the surface.

Ethylene glycol—prevents formation of scale deposits in the pipe.

Borate salts—used for maintaining fluid viscosity during the temperature increase.

Sodium and potassium carbonates—used for maintaining effectiveness of crosslinkers.

Glutaraldehyde—used as disinfectant of the water (bacteria elimination).

Guar gum and other water-soluble gelling agents—increases viscosity of the fracturing fluid to deliver proppant into the formation more efficiently.

Citric acid—used for corrosion prevention.

Isopropanol—used to winterize the chemicals to ensure it doesn't freeze.

The most common chemical used for hydraulic fracturing in the United States in 2005-2009 was methanol, while some other most widely used chemicals were isopropyl alcohol, 2-butoxyethanol, and ethylene glycol.

Typical fluid types are:

Conventional linear gels. These gels are cellulose derivative (carboxymethyl cellulose, hydroxyethyl cellulose, carboxymethyl hydroxyethyl cellulose, hydroxypropyl cellulose, hydroxyethyl methyl cellulose), guar or its derivatives (hydroxypropyl guar, carboxymethyl hydroxypropyl guar), mixed with other chemicals.

Borate-crosslinked fluids. These are guar-based fluids cross-linked with boron ions (from aqueous borax/boric acid solution). These gels have higher viscosity at pH 9 onwards and are used to carry proppant. After the fracturing job, the pH is reduced to 3-4 so that the cross-links are broken, and the gel is less viscous and can be pumped out.

Organometallic-crosslinked fluids zirconium, chromium, antimony, titanium salts are known to crosslink the guar-based gels. The crosslinking mechanism is not reversible, so once the proppant is pumped down along with cross-linked gel, the fracturing part is done. The gels are broken down with appropriate breakers.

Aluminum phosphate-ester oil gels. Aluminum phosphate and ester oils are slurried to form cross-linked gel. These are one of the first known gelling systems.

For slickwater it is common to include a temporary reduction in the proppant concentration to ensure the well is not overwhelmed with proppant causing a screen-off. As the fracturing process proceeds, viscosity reducing agents such as oxidizers and enzyme breakers are sometimes then added to the fracturing fluid to deactivate the gelling agents and encourage flowback. The oxidizer reacts with the gel to break it down, reducing the fluid's viscosity, and ensuring that no proppant is pulled from the formation. An enzyme acts as a catalyst for breaking down the gel. Sometimes pH modifiers are used to break down the crosslink at the end of a hydraulic fracturing job since many require a pH buffer system to stay viscous. At the end of the job, the well is commonly flushed with water (sometimes blended with a friction reducing chemical) under pressure. Injected fluid is recovered to some degree and managed by several methods such as underground injection control, treatment and discharge, recycling, or temporary storage in pits or containers. New technology is continually being developed to better handle waste water and improve re-usability.

There are a number of potential public health impacts of exposures to chemical and radioactive pollutants as a result of hydraulic fracturing. Some evidence suggests that contamination of groundwater, if it occurs, is most likely to be caused by leakage through the vertical borehole. Contamination of groundwater from the underground hydraulic fracturing process itself (i.e., the fracturing of the shale) is unlikely. However, surface spills of hydraulic fracturing fluids or wastewater may affect groundwater, and emissions to air also have the potential to impact on health.

Further environmental impacts of hydraulic fracturing include air emissions for the generators and pumps necessary to produce the incredible fracturing pressures, high water consumption, water contamination from all the chemical additives, land use, noise pollution, and health effects on humans. Moreover, overall cost associated with such known systems with expensive equipment (capital outlay and maintenance) and high cost of operation is dramatic, creating a need for lower cost systems. In addition, about 8.9 acres of land is needed per each drill pad for surface installations. Well pad and supporting structure construction significantly fragments landscapes which likely has negative effects on wildlife.

In addition to the above challenges in the fracking space is the presence of water in the borehole. Water in the well presents a problem when introducing air and fuel mixture to fragment a subterranean environment because the air and fuel mixture interacts with the water creating an inactive paste. This inactive paste does not auto-detonate when pressure is applied to it.

One solution for mining and quarrying applications where water is present involves imbedding blasting caps in an ammonium nitrate slurry to provide the heat and shock required for detonation. Introducing blasting caps and other traditional detonation means adds cost, complexity and safety concerns to the process. Thousands of feet of wire is typically required for the contemplated well holes with the attendant risk of potential misfire of the blasting caps, e.g., errant signal or a short prematurely detonating the mixture. A safer and more cost-effective/efficient method of providing detonation was desired.

What is therefore needed is a method of fracturing difficult-to-extract formations which does not use harmful chemical additives. What is further needed is a method of fracturing subterranean formations while occupying a much smaller footprint at the well's surface. An additional need is a method of fracturing that uses considerably less energy and therefore is less costly and produces less harmful byproducts and emissions. Further still, what is needed is a method of accomplishing these identified needs even when there is water present in the well.

SUMMARY AND OBJECTS OF THE INVENTION

In the traditional fracturing process, the fuel powder is dry, the area between the straddle packers is dry, and the formation may be dry or it may contain hydrocarbons in the form of crude oil, methane, or condensate. These hydrocarbons become added fuel for the process, limited by the amount of oxidizer available downhole. However, it is common for many oil and gas wells to generate large amounts of water with the oil and gas that is produced. In some cases, the ratio can be as high as 10:1, i.e., 10 barrels of water for every one barrel of oil. Water being present in the wellbore and in the formation creates a problem when applying the above desired process to such a well. Specifically, when the air/fuel mixture is pumped down into the well, the mixture reacts with the water and creates a paste that prevents the auto-ignition required for this process to take place.

The preferred embodiments address this common problem with a novel solution. To prevent the air/fuel mixture from becoming an inactive paste, alternative steps are introduced to the previously described method/apparatus. The preferred embodiments pump an emulsion mixture into the well prior to the air and fuel mixture, so that the emulsion mixture may intereact with the water first. The emulsion mixture forms a continuous phase atop the water, shielding the air and fuel mixture from mixing with the water, possibly turning it to paste. Once pressure is applied to the system, the air and fuel mixture auto-detonates due to the pressure, and the emulsion mixture detonates from the deflagration of the air and fuel mixture. The resulting explosion fractures the subterranean environment such that hydrocarbons can be recovered from the well hole.

More particularly, prior to the air/fuel mixture being pumped down the well, an emulsion mixture is first be pumped down the well and into the area between the straddle packers and into the existing fractures in the oil or gas bearing formation. The emulsion mixture contains ammonium nitrate ($NH_4NO_3$), fuel oil/mineral oil, and a polymeric surfactant (emulsifier), sensitized to, for example, approximately 5.7%.

Once the emulsion mixture is in place, the process returns to the previously disclosed original steps. The air/fuel mixture is pumped down the well, the ice plug/pig is inserted into the well, and water is pumped behind it to increase pressure applied to the air and fuel mixture. This pressure causes the auto ignition of the air and fuel mixture and introduces hot gases into the area between the straddle packers that now contains the emulsion. These hot gases then cause the emulsion to detonate, resulting in the additional release of hydrocarbons from the subterranean formations. It is an object of the present invention that the ammonium nitrate is detonated by the deflagration of the air and fuel mixture that occurs as a result of the auto ignition, not imbedding blasting caps in the slurry to provide the heat and shock required for detonations. Thus, no blasting caps or additional detonations are required and the process can be performed using exclusively pumps.

A combustible mixture of an oxidizer and a fuel, preferably an air and fuel mixture, may be flowed into the well hole. An aqueous mixture with a mass may be pumped into the well hole which compresses the combustible mixture with the mass of the aqueous mixture pressing down on the combustible mixture. The combustible mixture may be caused to auto-ignite under the compressive force of the mass of the aqueous mixture thereby fracturing at least a portion of the subterranean well location. A plurality of hydrocarbons emitted from the fractured subterranean well location may then be collected.

The fuel for the air and fuel mixture may include any known fuel, but preferably is one of a group including diesel fuel, a carbohydrate including wheat flour, corn flour, rice flour, barley flour, organic starches, powdered plastics, powdered coal, powdered fecal matter. A plurality of piezo crystals may be added to the air and fuel mixture as they provide sparking under pressure and friction, which may assist detonation of the air and fuel mixture when desired.

The fuel preferably is diesel fuel and the diesel fuel is aerosolized with the oxidizer. The oxidizer is at least one of aluminum nitrate, ammonium nitrate, and ambient air at a surface of the well hole.

A packer plug may be inserted into the well hole before and after the air and fuel mixture. The packer plug may be pressed further down the well hole thus creating the application of pressure to auto-detonate the air and fuel mixture.

Following detonation of the air and fuel mixture, the well hole may be sterilized with steam generated from the auto-detonation of the aqueous mixture eliminating the need of a bacteriacide.

Frozen water may be used as a pressure barrier between the aqueous mixture and the air and fuel mixture allowing the application of pressure to the air and fuel mixture without submersing the air and fuel. A proppant may also be added to the aqueous mixture to ensure newly created fissures remain open. The aqueous mixture may include a mixture of liquid water and a gel made from at least one of guar and cross linked polymers.

According to a first preferred embodiment, a method of fracturing includes drilling a well hole into a subterranean well location and then pumping an emulsion mixture into the well hole. Next, a combustible mixture of an oxidizer and a fuel is flowed into the well hole and compressed with a mass of a mixture delivered to the well hole. This causes the combustible mixture to auto-ignite under a compressive force of the mass, thereby causing the emulsion mixture to detonate due to the auto-ignition of the air and fuel mixture. As a result, at least a portion of the subterranean well location is fractured with the explosion from the detonation of the emulsion mixture. At this point, a plurality of hydrocarbons emitted from the fractured subterranean well location can be collected.

In another aspect of this embodiment, the mass of mixture is an aqueous mixture that is flowed into the well hole.

In a further aspect of this preferred embodiment, a shocking mixture is flowed into the hole following the auto-ignition and detonation, providing additional fracturing by creating a steam and a thermal shock to the subterranean location.

In another aspect of this preferred embodiment, the emulsion mixture contains ammonium nitrate, oil, and a polymeric surfactant. The oil may be at least one of fuel oil and mineral oil.

According to another aspect of this embodiment, the emulsion mixture is sensitized within a range of 3%-10%, and more preferably, 5-6%.

According to yet another aspect of this embodiment, the emulsion mixture is pumped into the well to interact with a mass of water in the well hole, preventing the water from inactivating the air and fuel mixture.

In another preferred embodiment, a system for fracturing a subterranean well location with a well hole includes a first packer plug inserted into the well hole, and a mass of an emulsion mixture, positioned atop the first packer plug, to interact with any water present in the well hole. A mass of a combustible mixture of an oxidizer and a fuel, is also positioned atop the first packer plug and the mass of the emulsion mixture. A second packer plug is inserted into the well enclosing the mass of the emulsion mixture and the mass of the combustible mixture of oxidizer and fuel. The system also includes the introduction of a mass of aqueous mixture. The mass of aqueous mixture compresses the mass of combustible mixture to auto-detonate the mass of combustible mixture, and the mass of the emulsion mixture is detonated by a deflagration of the mass of the combustible mixture.

In another aspect of this preferred embodiment, the emulsion mixture is one of a group including ammonium nitrate and at least one of a fuel oil, mineral oil, and a polymeric surfactant.

In yet another aspect of this embodiment, wherein the fuel is one of a group consisting of diesel fuel, a carbohydrate including wheat flour, corn flour, rice flour, barley flour, organic starches, powdered plastics, powdered coal, and powdered fecal matter, and may include a plurality of piezo crystals. The fuel is diesel fuel and the diesel fuel is aerosolized and the oxidizer is at least one of aluminum nitrate, ammonium nitrate, and ambient air at a surface of the well hole.

According to another aspect of this embodiment, the first packer plug includes a pressure reducing orifice.

In another aspect of this preferred embodiment, the aqueous mixture is a mixture of liquid water and a gel made from at least one of guar and cross-linked polymers.

According to yet another embodiment, a system to collect hydrocarbons from a subterranean environment includes a well hole extending a predetermined depth sufficient to reach a hydrocarbon deposit. A mixture pump that flows an emulsion mixture into the well hole that may interact with any water present in the well hole. A compressor flows an air and fuel mixture into the well hole and a fracking pump flows an aqueous mixture into the well hole to apply pressure to the air and fuel mixture to auto-detonate the air and fuel mixture. The emulsion mixture is detonated by the auto-detonation of the air and fuel mixture. The subterranean environment is fractured with the energy of the auto-detonation of the air and fuel mixture and the detonation of the emulsion mixture to allow recovery of a plurality of hydrocarbons in the hydrocarbon deposit from the well hole.

In another aspect of this embodiment, a first packer plug positioned at a distal end of the well hole and a second packer plug driven in to the well hole to compress the emulsion mixture and air and fuel mixture. The weight of the aqueous mixture applies pressure to the second packer plug.

According to another aspect of this embodiment, the aqueous mixture is a mixture of liquid water and a gel made from at least one of guar and cross-linked polymers, and wherein the fuel is one of a group including diesel fuel, a carbohydrate including wheat flour, corn flour, rice flour, barley flour, organic starches, powdered plastics, powdered coal, and powdered fecal matter, and may include a plurality of piezo crystals.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary, and, therefore, non-limiting, embodiments illustrated in the drawings accompanying and forming a part of this specification, wherein like reference numerals designate the same elements in the several views, and in which:

FIG. 5A illustrates a partial cross-section side view of the packer as used with respect to FIG. 3A;

FIG. 5B is a partial cross-sectioned view of the fracking apparatus of FIG. 5A installed in a formation;

Figure 1:
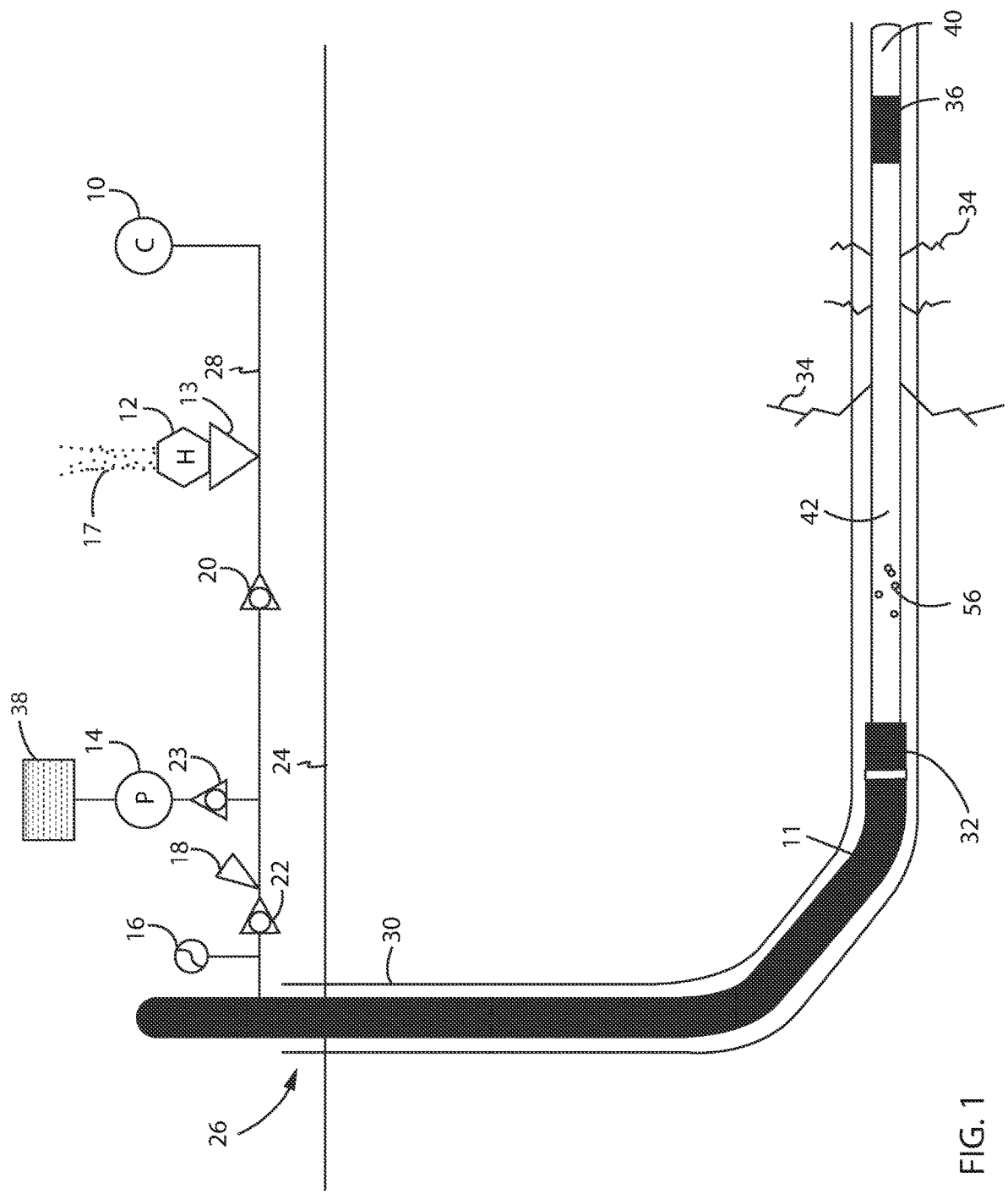
FIG. 1 illustrates a schematic view of a first embodiment of the invention with an open hole and single packer.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, one embodiment of the invention is shown. Above the ground surface 24 piping 28 connects an air compressor with a powder mixing hopper 12. The powder mixing hopper 12 may add either a powder carbohydrate into the piping 28 or it may be configured to inject any other fuel source such as diesel fuel. The powder carbohydrate may include any carbohydrate such as corn starch, flour, animal/human waste, or any other known starch. The powder and/or fuel is injected into the piping 28 and is effectively aerosolized by the air compressor 10. This forms an air fuel mixture within the piping 28.

Ambient air from above the ground surface 24 is ingested into the air compressor 10. Pressurized air is created and clean dry air is flowed to and through an air educator located at the bottom of the hopper 12. The air educator in the hopper 12 creates a vacuum that pulls in the explosive powder or fuel mixture contained in the hopper 12. The air and fuel mixture then flows to and thru a check valve 22. This check valve 22 prevents the mixture from flowing backwards in the piping 28.

From the check valve 12 the air and fuel mixture flows through the piping 28 and to the bottom of the well 30. A packer, such as an inflatable packer 36, may be inserted into the well 30 and act as a stop which prevents the air and fuel mixture 56 from reaching a portion of the well 30 where fracturing is not desirable. The inflatable packer 36 then creates a sealed well area 40 that does not get fractured.

The air and fuel mixture, now inside the well 30, is pumped through the well 30 until it is stopped by the inflatable packer 36. This packer 36 stops the flow of the air and fuel mixture 56 and causes it to flow into any naturally occurring fissures 34 in the formation.

The air fuel mixture 56 flows through a "pig" launcher 18 just above the ground surface 24. During the pumping of the air and fuel mixture 56, its velocity is kept low in order to allow heat built up by friction in the air and fuel mixture 56 to be dissipated into the formation. This transfer of heat in to the formation prevents premature ignition of the air and fuel mixture 56.

An added check valve 20 and pressure gage 16 is used to monitor the flow and into the well head 26. The pig launcher 18 is an injection port where a "packer pig" may be introduced into the well head 26. A packer pig or pig refers to a plug that may be inserted down into the well 30 and act as a barrier that restricts transmission of fluids, but allows the fluid to build up and generate pressure. Preferably, the pig is in the form of a dissolvable and temporary product. One embodiment may include ice but any substance that dissolves may be used. The ice pig 32 can plug up the well 30 and allow a liquid 38 to be pumped in by the liquid pump 14. After the well 30 has received a predetermined amount of explosive air and fuel mixture 56, the ice pig is placed in the launcher 18 and the liquid (water) pump 14 is engaged. The liquid pump 14 may be used to deliver any aqueous mixture. Preferably, water is used and all other chemicals are avoided. This prevents introduction of harmful surfactants, biocides, or any other chemicals. Water pumped by the liquid pump then pushes the ice pig 32 ahead of it, blocking the explosive air and fuel mixture 56 from getting behind it, and creating a water column.

This column of water becomes a piston causing the explosive air and fuel mixture 56 to compress within the compression chamber 42. The rate of this compression is controlled to again allow the heat of compression to be dissipated in to the formation and avoid premature ignition of the mixture.

Once a predetermined amount of water 38 (or water and proppant) has been pumped in to the well 30, the rate of injection is abruptly and dramatically increased. This rapid increase in water injection compresses the explosive air and fuel mixture 56 within the compression chamber 42 at a rate at which the formation cannot effectively accept the transfer of heat. At this point, heat builds up within the explosive air and fuel mixture 56 and auto-ignition temperature is reach causing it to detonate.

All of the kinetic energy of the explosion goes in to the formation. Any naturally occurring methane within the naturally occurring fissures will add to the explosion. The explosion will create a large amount of heat and it will be absorbed by the formation. The ice pig 32 at this point may be dissolved and the water 38 that once provided pressure on the explosive mixture will now flow, under pressure, in to the fissures 34 where they will be thermally shocked causing fracturing. Heat will be transferred into the water creating steam whose pressure will create additional fracturing 34. The water will eventually condense, becoming distilled water with its microbes killed by the heat, and flow out of the well with well gas and or oil and produced water.

Figure 2:
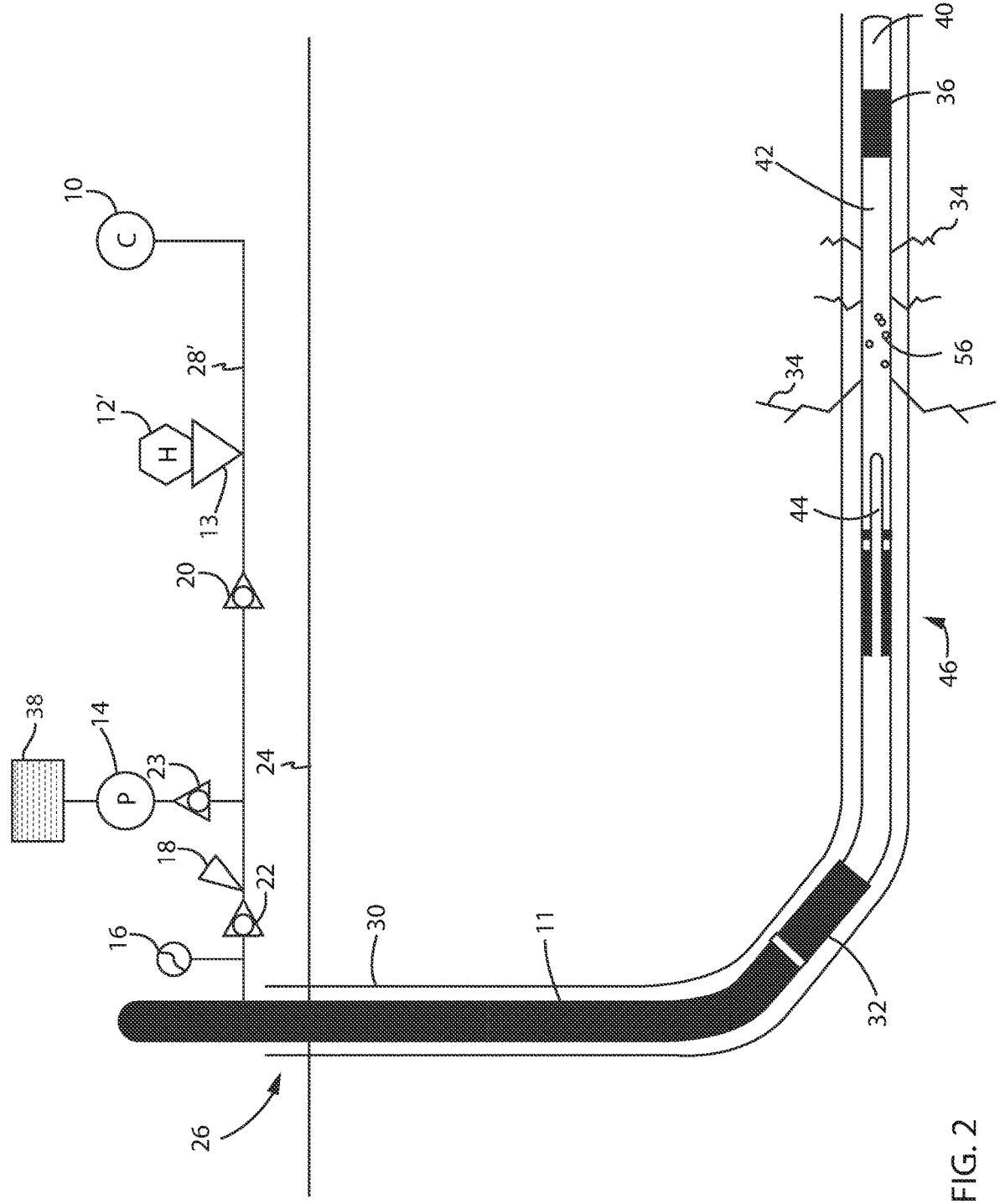
FIG. 2 illustrates a schematic view of an alternative embodiment of the invention with two packers in a production cased well hole.
Figures 3A, 3B:
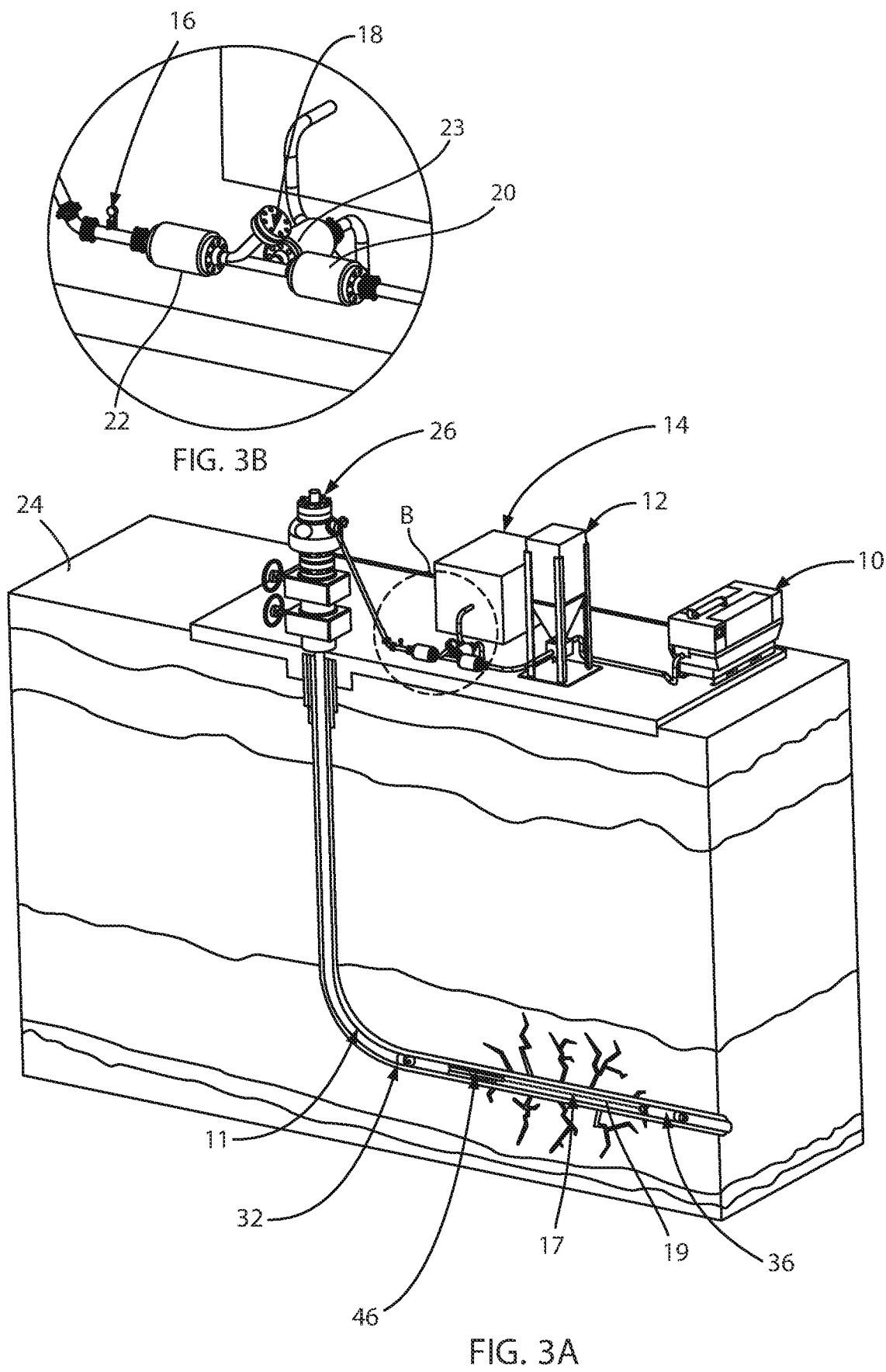
FIG. 3A illustrates a schematic perspective view of an alternative embodiment of the invention with two packers in a production cased well hole as shown in FIG. 2, with further clarity.
FIG. 3B is an exploded view of a portion of the fracking apparatus shown in FIG. 3A.
Figure 4:
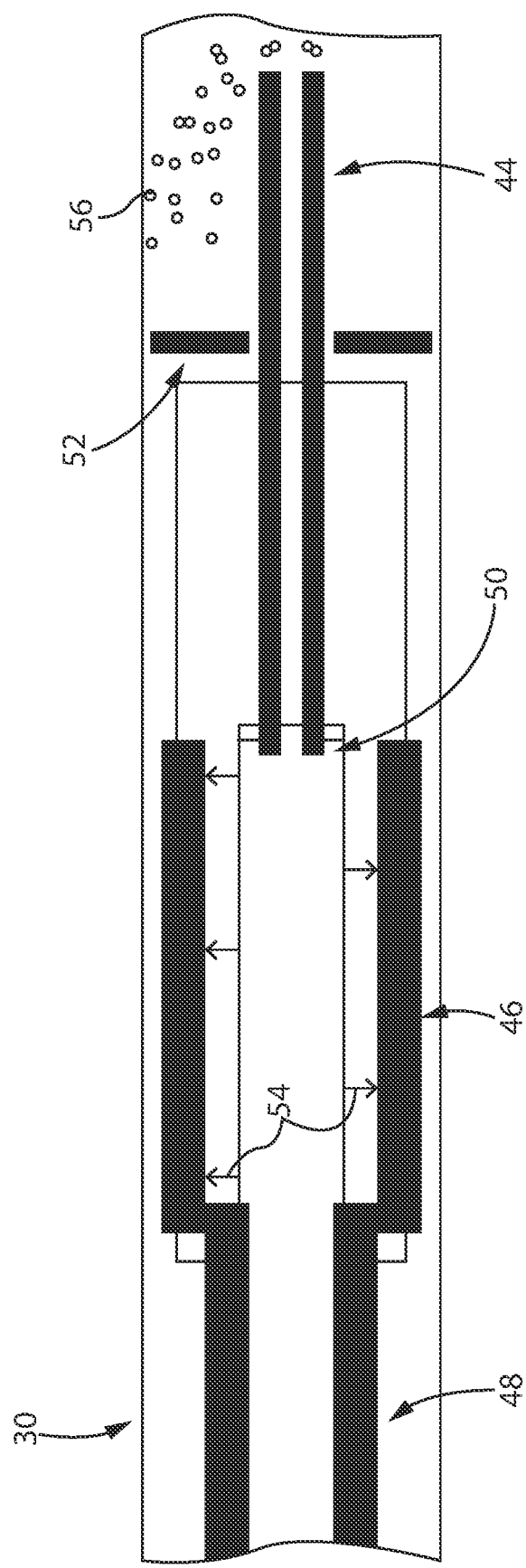
FIG. 4 illustrates a partial cross-section schematic side view of the packer as used with respect to FIG. 2.

Referring now to FIGS. 2, 3A, 3B, 4, 5A, and 5B, an alternative embodiment is described. FIGS. 2, 3A, and 3B show an overall schematic of the invention while FIGS. 4 and 5A and 5B show an inventive packer for executing the process, illustrated, e.g., schematically together with the system in FIGS. 2, 3A, and 3B.

Similar with respect to FIG. 1, and with more specific reference to FIGS. 2 and 3A, ambient air above the ground surface 34 is ingested into air compressor 10. Pressurized air is generated by the air compressor 10 and clean dry air is flowed to and thru an air educator located at the bottom of hopper 12. The air educator of the hopper 12 creates a vacuum that pulls in an explosive air and fuel mixture 56 contained in the hopper 12. The air and fuel explosive mixture 56 then flows to and thru a check valve 22. This check valve 22 prevents the air and fuel mixture 56 from flowing backwards in the piping 28. From the check valve 22 the air and fuel mixture 56 flows to the output of liquid pump 14, and through a pig launcher 18 (see FIG. 3B), check valve 20, pressure gage 16 and in to the oil well head 26.

Now inside the well 30, the air and fuel mixture 56 is pumped down the well 30 and into the firing chamber 50 of a packer such as an inflatable packer 46. FIGS. 4 and 5A show more detailed and close-up views of the inflatable packer 46. The explosive air and fuel mixture 56 flows though the smaller diameter stinger 44 and in to the area between the inflatable packer 46 and the inflatable packer 36. Once inside this compression chamber 42 the air and fuel mixture 56 will attempt to flow back through the filter pad 52 and into the lower pressure area behind the inflatable packer 46 and outside of the compression chamber 42. The filter pad 52 will capture the powder or other fuel in the air and "load" up. This loading creates a rise in the air pressure in the production tubing casing 30 causing the inflatable packer 46 to "set", closing off the area between the inflatable packer 46 and the casing 30. This pressure increase will be detected as a rise in pressure at the pressure gage 16 at the ground surface 24.

As the air and fuel mixture 56 is pumped into the compression chamber 42, its velocity is kept low in order to allow heat built up by friction in the mixture to be dissipated into the casing 30. Keeping the air and fuel mixture 56 pumped at a low velocity allows ample time to transfer frictional heat into the casing 30 and prevents premature ignition of the air and fuel mixture 56. This also eliminates the need for adding lubricants and other fracking fluids to the air and fuel mixture 56.

Once a rise in pressure is detected at the ground surface 24 by the pressure gage 16, the compression chamber 42 between the inflatable packer 46 and the other inflatable packer 36 is full of sufficient air and fuel mixture 56. The inflatable packer 46 is then ready. A ball of ice, or an ice pig 32, may then be inserted into the pig launcher 18 and the liquid pump 14 is engaged.

Water pumped by the liquid pump 14 pushes the ice pig 32 ahead of it, blocking the explosive air and fuel mixture 56 from getting behind it, and creating a water column. This column of water becomes a piston causing the explosive air and fuel mixture 56 within the compression chamber 42 to compress. The rate of this compression is controlled to again allow the heat of compression to be dissipated in to the casing 30 and avoid premature ignition of the air and fuel mixture 56.

Once a predetermined amount of water (or water and proppant) has been pumped into the well, the rate of injection is abruptly and dramatically increased. This rapid increase in water injection rapidly compresses the explosive air and fuel mixture 56 in the firing chamber 50 at a rate at which the inflatable packer 46 cannot effectively accept the transfer of heat. At this point, heat builds up within the explosive air and fuel mixture 56 and auto-ignition temperature is reached causing detonation. Heat and explosive gases are now directed through the stinger 44 and in to the explosive laden compression chamber between the inflatable packers 46 and 36. This causes ignition of the explosive air and fuel mixture 56 between the packers 46 and 36. Much of the pressure from the explosion is prevented from moving back thru the packer by the reduced and smaller opening in the stinger 44, as shown best in FIG. 4 and FIGS. 5A and 5B.

To maintain fracturing in the region of interest, the separation between the packers (such as the mechanical or inflatable delta "P" packer and the inflatable or settable mechanical packer, shown in FIGS. 3A and 5B) is preferably maintained. Typically, the packers are set so as to maintain their positions in the well during the fracturing event. This arrangement relies on setting the packers so the friction force between the outer surface of the packer and the inner wall of the well is sufficient to prevent either of the packers from dislodging from its location and possibly shooting back through the well. However, increasing this clamping force when setting the packers can be difficult (a system which allows the user to set the packers with less clamping force is desired), and the resultant friction force is often insufficient to maintain packer position during fracturing. Therefore, as an option to aid in maintaining this separation, a link (as shown in FIGS. 3A and 5B) may be added between the packers to couple the two to one another. By coupling the two, maintaining packer position is ensured so that the surface area of the compression chamber is constant and fracturing occurs in the region of interest.

To accommodate the turn of well 30 from the vertical to the horizontal, the link may include several bars or sections coupled, for example, using a clevis fastener and an eye (shown schematically in FIGS. 3A and 5B) provided on the ends of two or more successive sections of the link. In this way, the desired distance between the packers can be maintained through the fracturing process.

All of the kinetic energy of the explosion is absorbed in to the formation and spreads through any naturally occurring fissures 34. Any naturally occurring methane within the naturally occurring fissures 34 will add to the explosion. The explosion of the air and fuel mixture 56 may by itself cause new fissures 34 to form. The water that once provided pressure on the explosive air and fuel mixture 56 will now flow under pressure through the dissolved ice pig 32 and in to the fissures 34 where they will be thermally shocked causing additional fracturing. Heat will be transferred into the water creating steam whose pressure will create even more fracturing. The water will eventually condense, becoming distilled water with its microbes killed by the heat, and flow out of the well with wells gas and/or oil and produced water.

Figures 6, 6A:
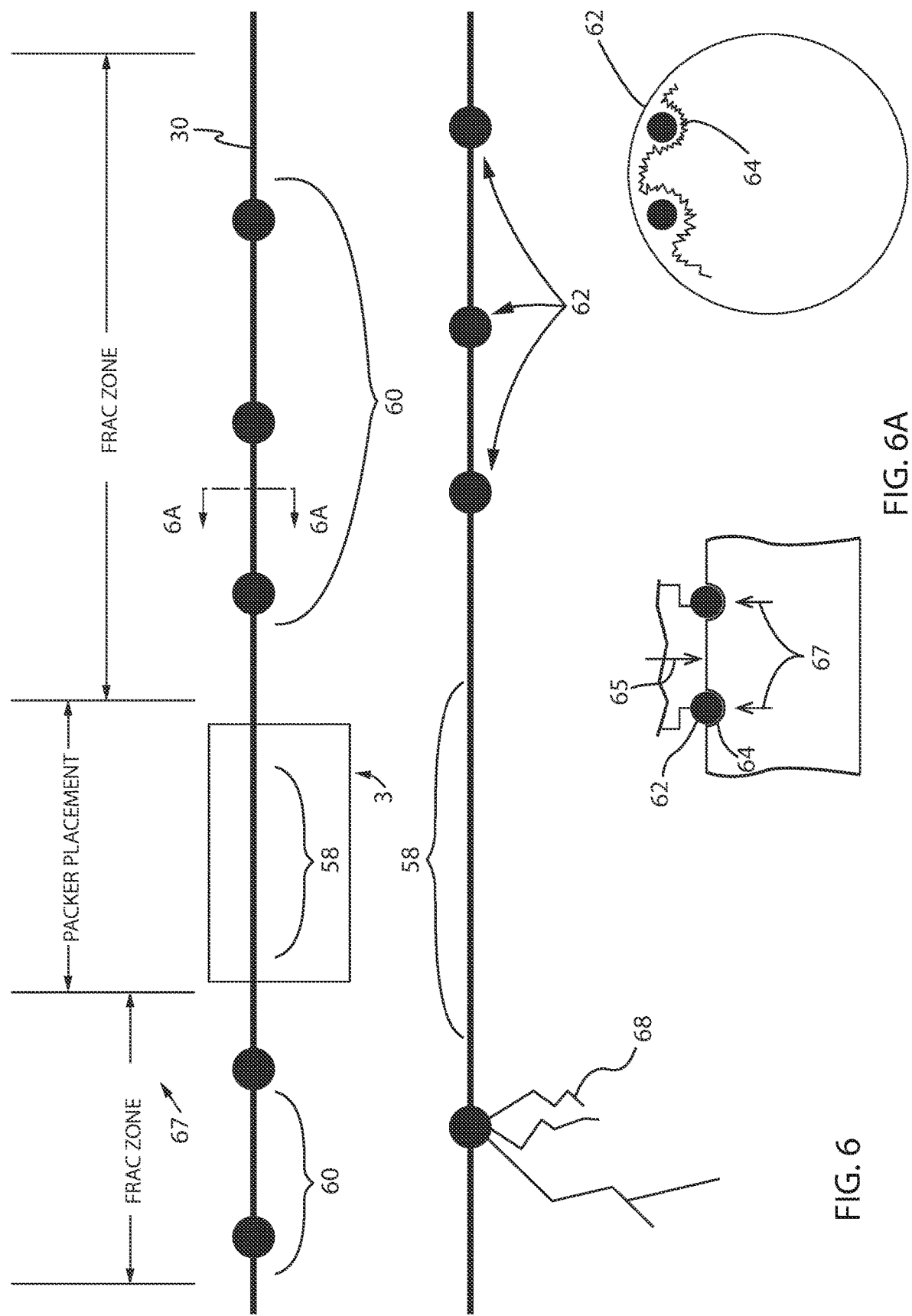
FIG. 6 illustrates a partial cross section side view of another embodiment of the invention.
FIG. 6A is a detail view of a portion of the fracking apparatus shown in FIG. 6.
Figure 7:
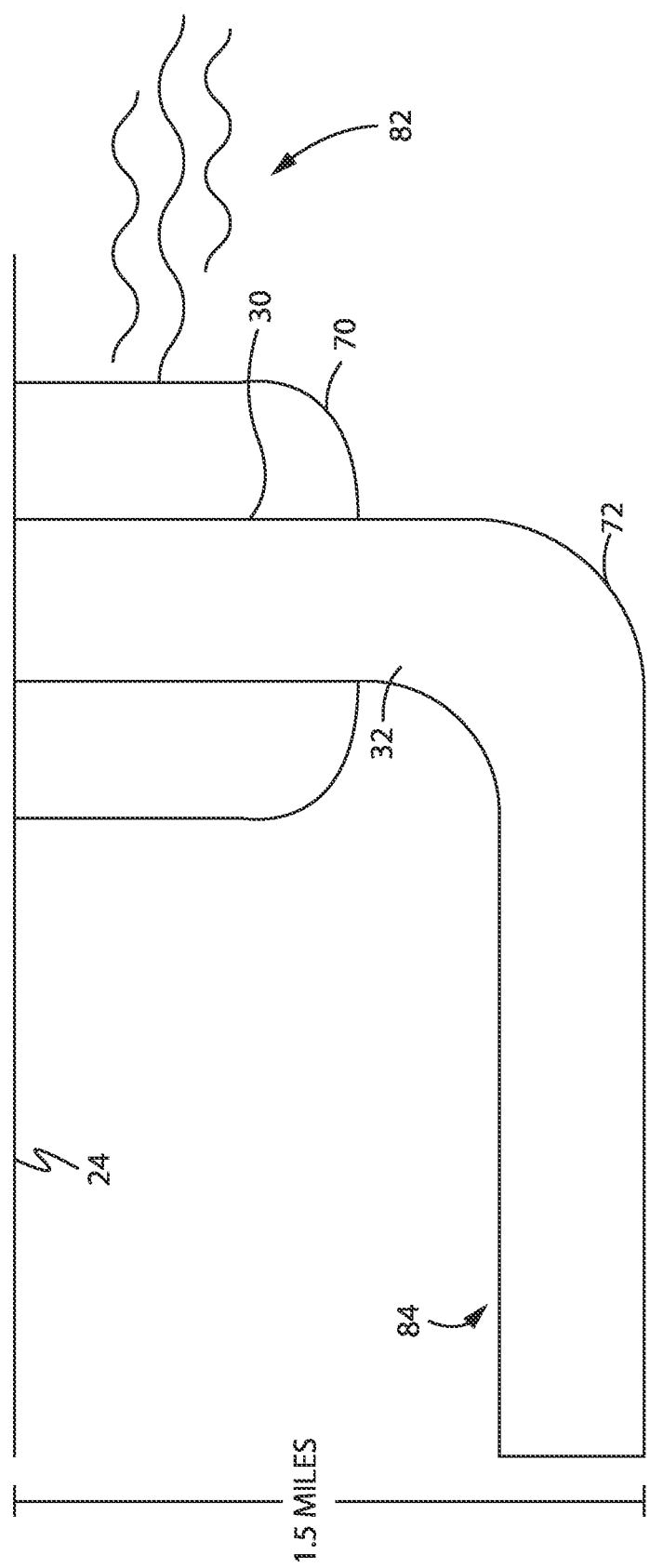
FIGS. 7-13 illustrate chronological schematic cross-sectional side views of a method of executing the fracking operation of a preferred embodiment.

Referring now to FIGS. 6A and 6B, another embodiment of the invention is shown. Ceramic balls 62 may be imbedded into the well casing 30. The embedded ceramic balls 62 provide a convenient way to create openings in the casing for fracturing the formation that surrounds it. This casing 30 is traditionally installed in the well and cemented in a normal manner Inflatable packers may then be positioned in the areas between the groupings of embedded ceramic balls shown as packer placement 58.

When an air and fuel mixture 56 is detonated (as outlined with respect to FIGS. 1 and 2), the ceramic balls 62 are forced out of their embedded pockets 64 and into the formation 66 creating a fracture 68 and leaving the remains of the ceramic ball as a proppant to hold the newly fractured 68 formation 66 open. This method eliminates the need for conventional perforations in the casing 30 and can be used in "overbalanced" (pressurized formation) as well as "balanced" and "underbalanced" (negative pressure) formations. Balanced formations define formations with a consistent density and hardness of the surrounding geology. Underbalanced refers to geology with inconsistent density and hardness, which makes it difficult to achieve uniform fracturing. Some formations may fracture before others absorbing all of the explosive energy. The ceramic balls 62 may be affixed to the casing in any known manner, but preferably are epoxied into dimple pockets 64 that may be machined in to the casing 30. The ceramic balls 62 ensure even and thorough fracturing.

FIGS. 7-13 summarize and illustrate a preferred embodiment of the process and the method of fracturing. Beginning with FIG. 7, a well hole 72 may be drilled into the earth below the ground surface 24. In order to keep the well hole 72 open, a steel liner, or well casing, 30 may be pressed into the well hole. Cement 70 or concrete is typically pumped around the casing 30 for added strengthening. The casing 30 and cement 70 also ensure that the well hole 72 is sealed and any surrounding aquifer 82 is protected. Any aquifers 72 are commonly located closer to the ground surface 24 than the targeted fracking area 84. For example, the typical fracking area is about 1.5 miles below the ground surface 24. Most aquifers 82 are 100 feet or less below the ground surface 24.

Figure 8:
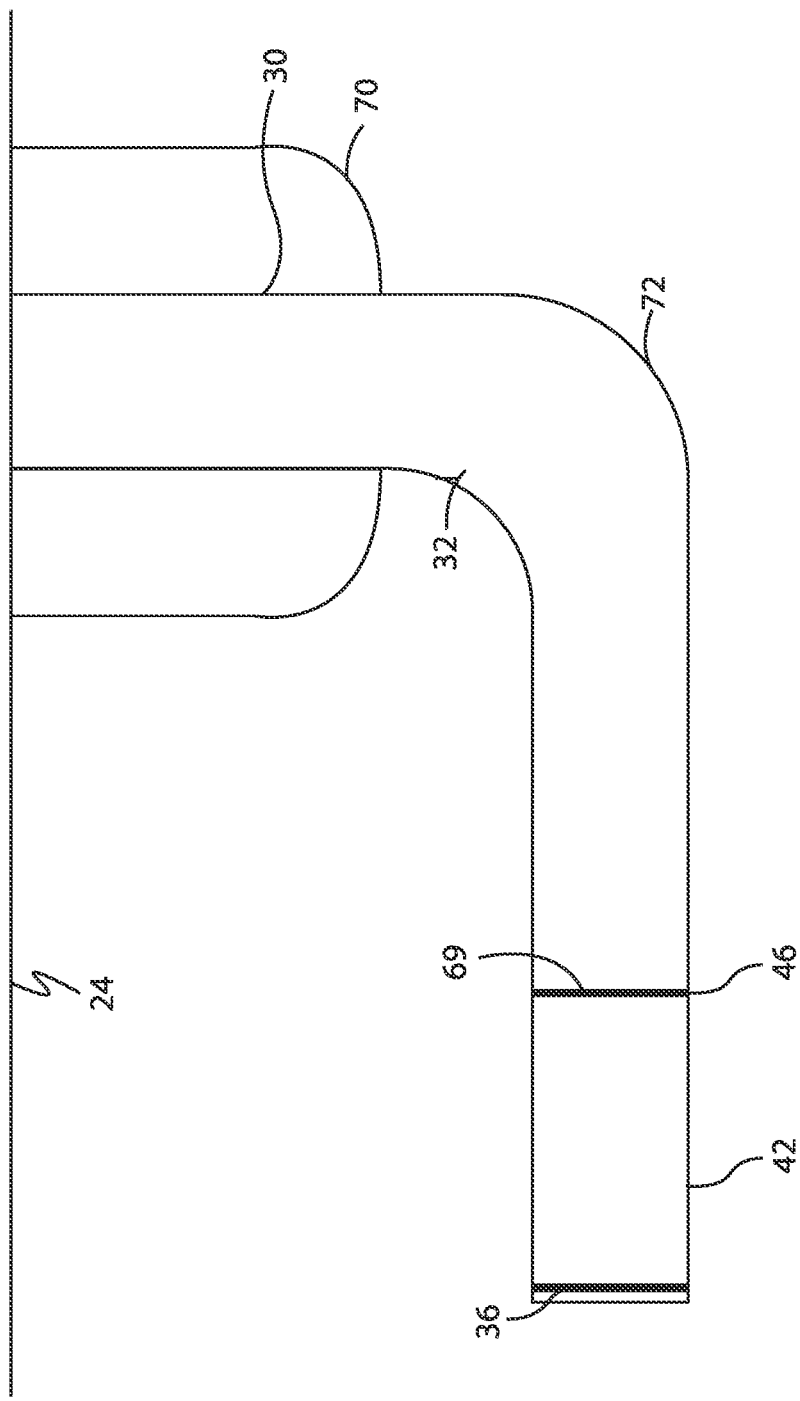
Figure 9:
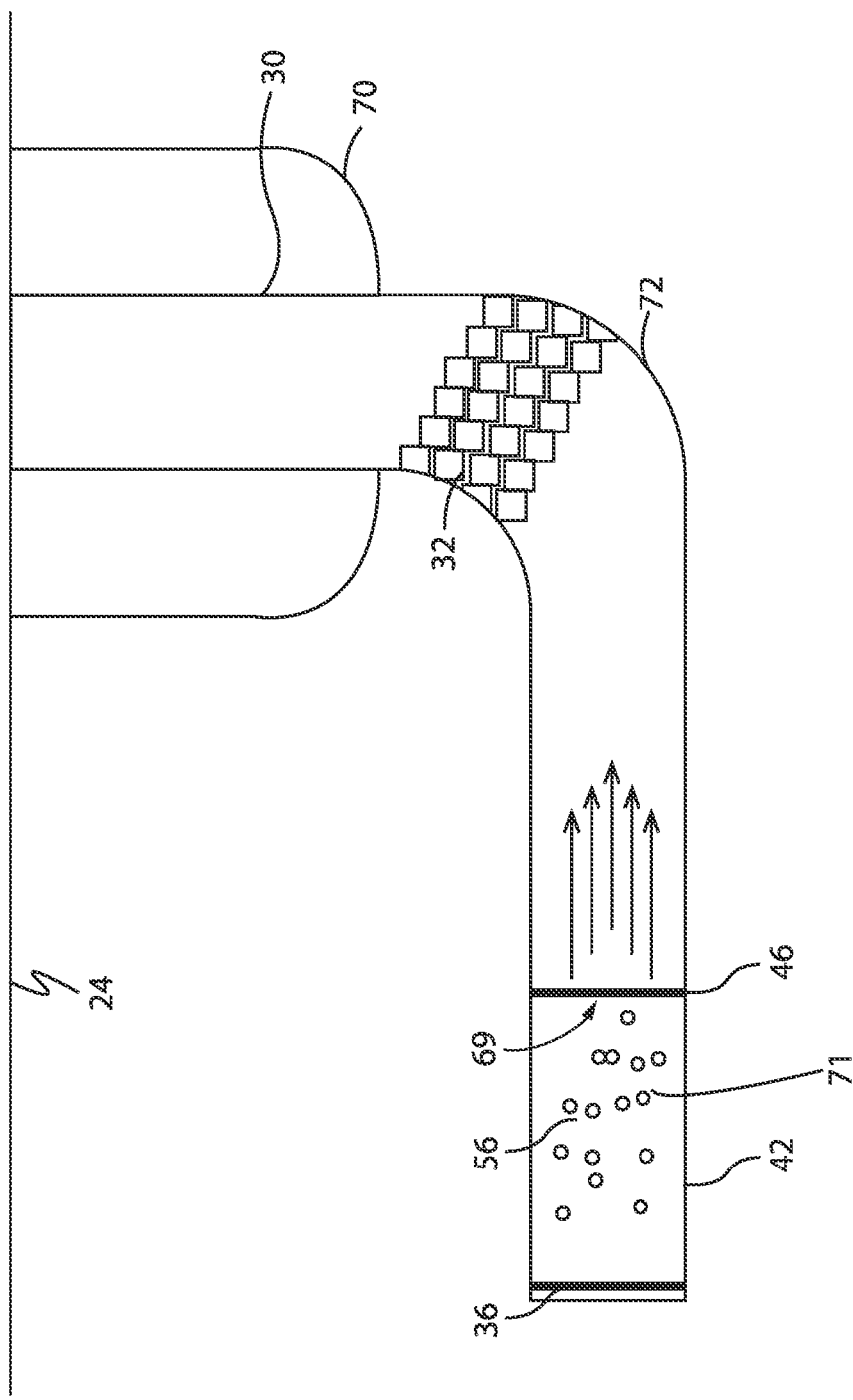

As shown in FIG. 8, following creation of the well hole 72, a first packer plug 36 may be inserted into the well hole 72. A second packer plug 46 may then be placed into the well hole 72 creating a pressure chamber 42, as described with respect to FIGS. 1 and 2. FIG. 9 discloses the air and fuel mixture 56 which may be pumped into the compression chamber 42. Air may be displaced out of the compression chamber and exit packer plug 46 out of a vent hole. The vent hole may include a check valve to prevent re-entry of displaced material. As the air and fuel mixture 56 is pumped into the compression chamber 42, the pressure within the compression chamber 42 is monitored to ensure ignition is not prematurely attained.

Figure 10:
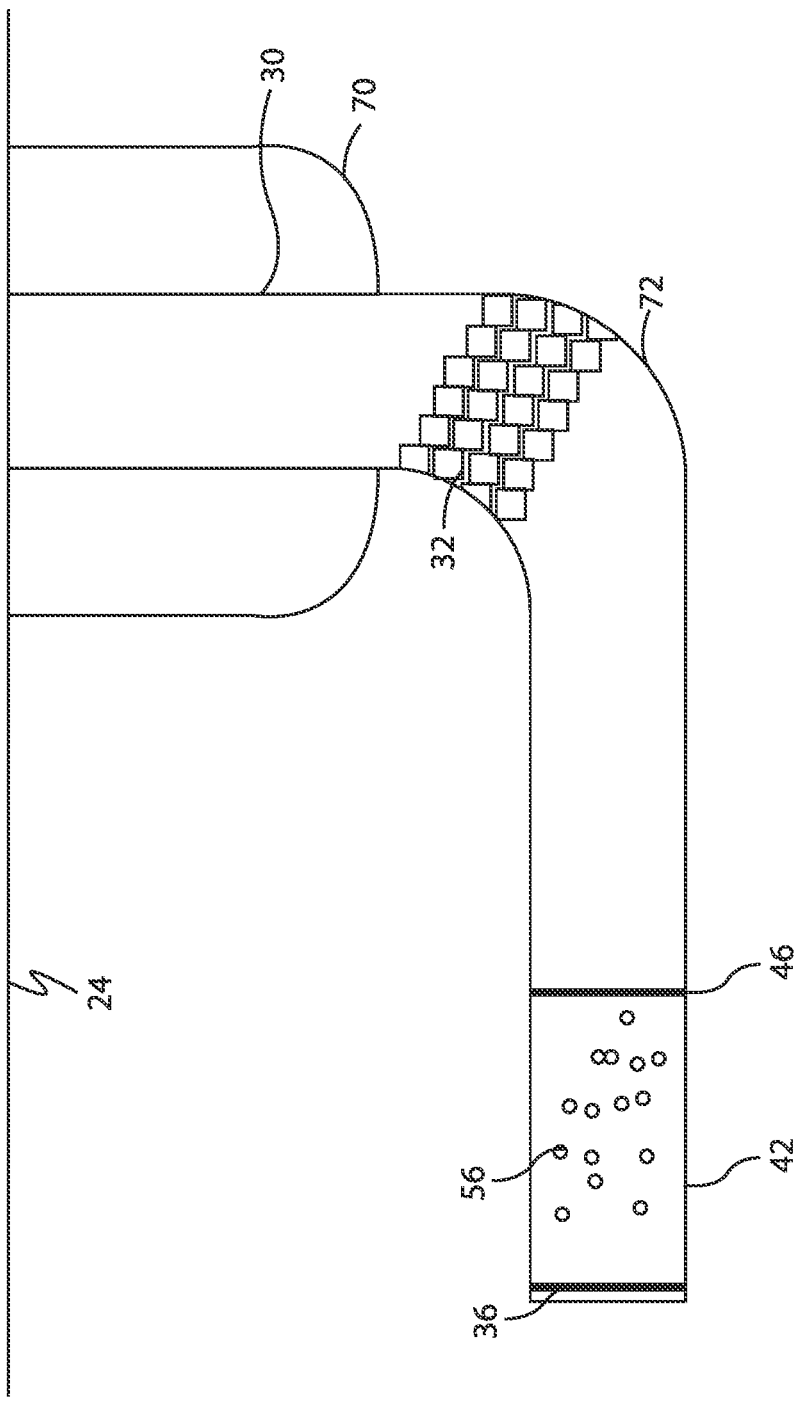
Figure 11:
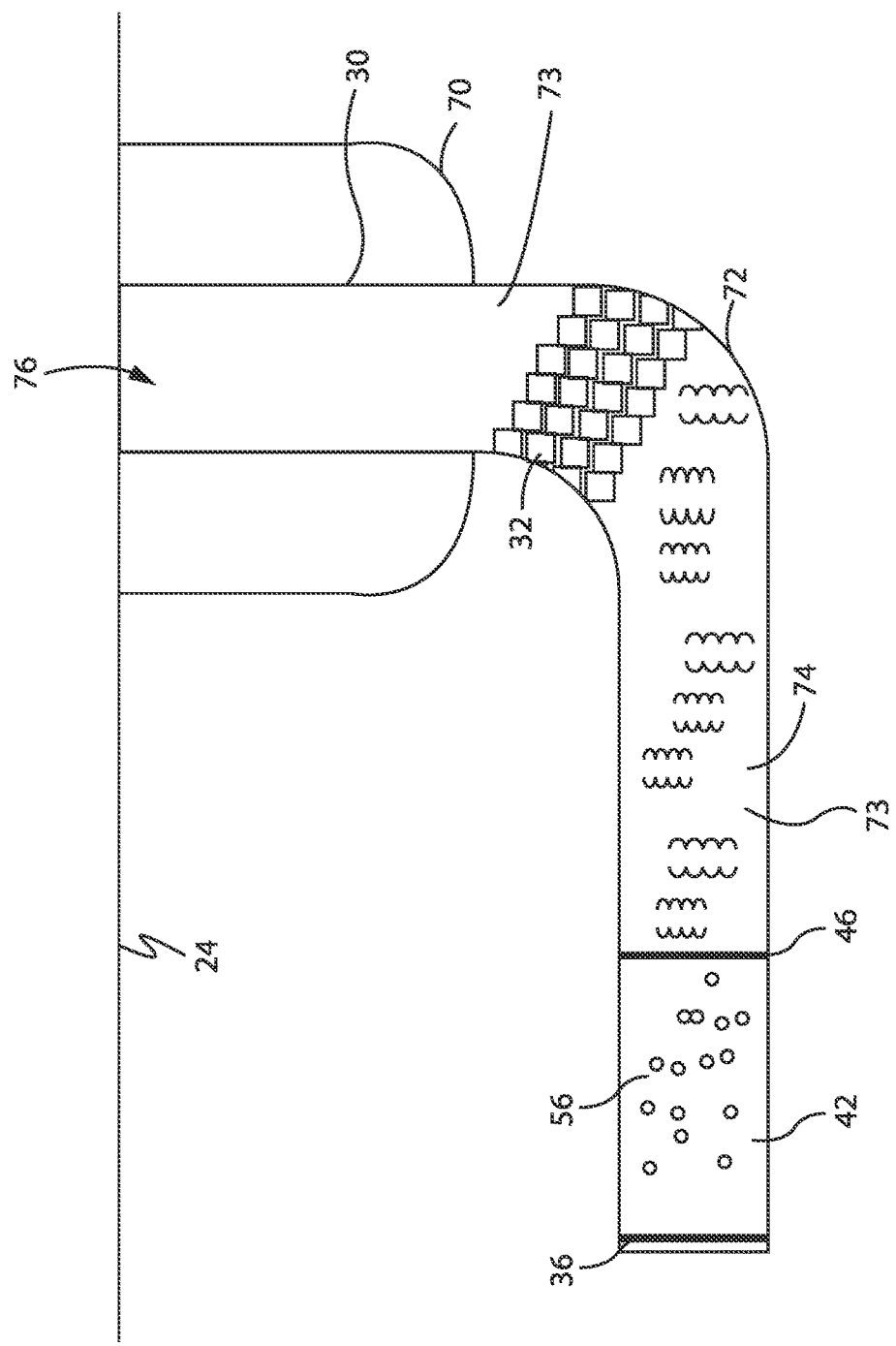

Shown in FIG. 10, the ice pig 32 may then be placed into the well hole 72 to create a pressure barrier and prevent any fluid from rushing to the compression chamber 42. The fluid is also kept separate to ensure proper detonation of the air and fuel mixture 42. Referring to FIG. 11 water 76 may be injected into the well hole 72. The ice pig 32 forms a pressure barrier and keeps the water 76 from filling the entire well hole 72. The ice pig 32 acts as a movable piston and compresses the space in the well hole building up pressure 74. The pressure 74 presses against the compression chamber 42.

Figure 12:
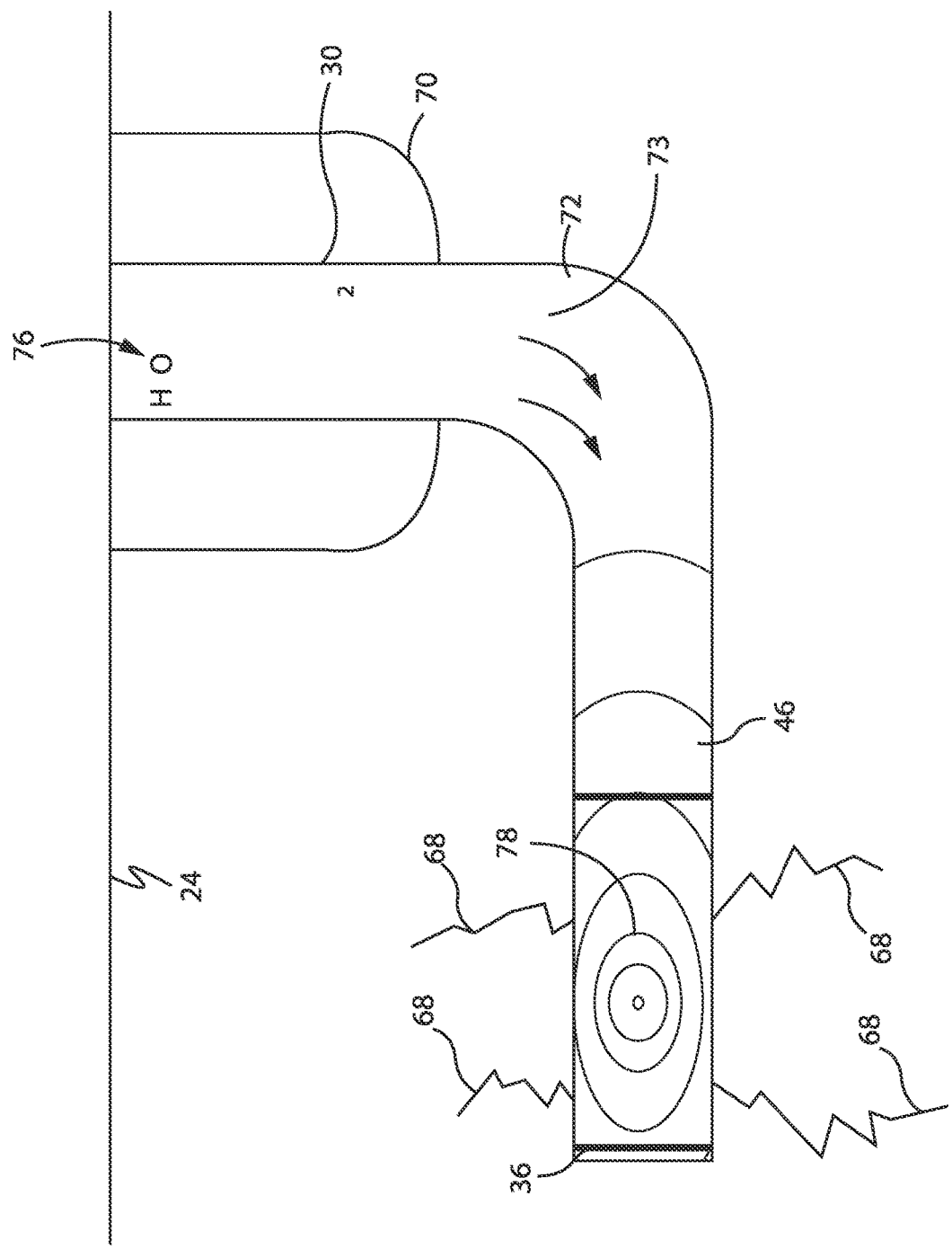
Figure 13:
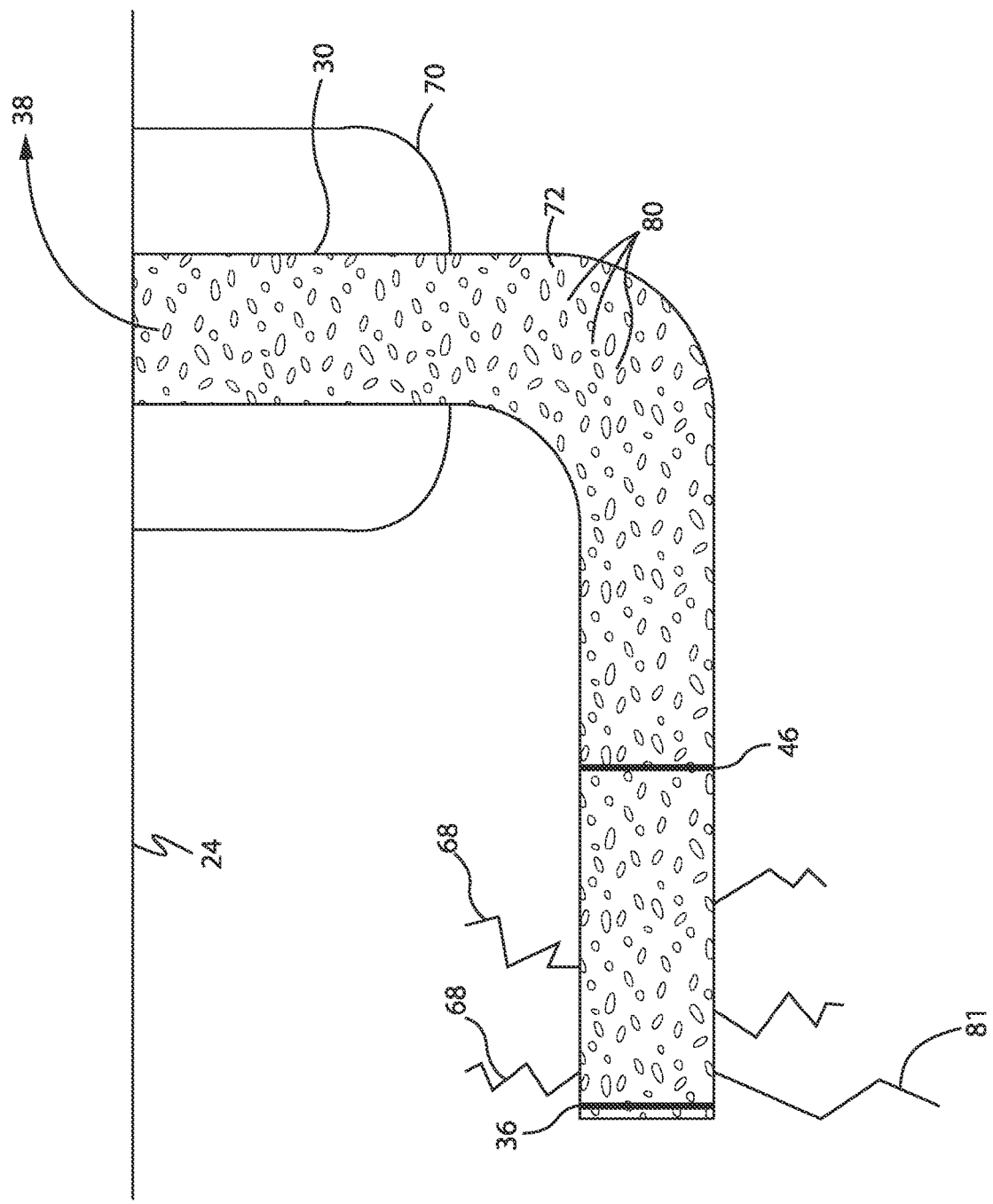

Referring to FIG. 12, the pressure causes the air and fuel mixture within the compression chamber 42 to auto-ignite and explode causing fractures 68. The water 76 may then rush in to fill the well hole 72 after the ice pig 32 is dissolved. The intense heat generated by the explosion vaporizes the water 76 forming steam 80 as seen in FIG. 13. The steam 80 expands causing additional fractures 68. The heat from the steam 80 and the explosion also sterilize the well hole 72 and eliminate the need for chemicals commonly used to prevent bacteria growth.

The pure water may then be pumped out of the well hole 72 and any hydrocarbons may be collected from the well. As harmful fracking fluids are not necessary, the water may be re-used and safely stored. The surrounding aquifers are also further protected as there are no chemicals to leech into the ground. Any oil mixed within the water may also be easily skimmed and collected.

An added benefit is that the auto-ignition pressure point of the air and fuel mixture 56 is significantly lower than the amount of pressure required to fracture using known methods, such as hydraulic fracturing. Known fracking methods require 20,000 psi or greater pressure to crack the formations. Producing this kind of pressure requires a great deal of energy. This energy is produced above the ground surface by engines combusting hydrocarbons. Many engines are commonly used to operate a multitude pumps. The inventive fracking method only requires a relatively small amount of pressure to fracture the subterranean formations. The weight of the water column injected into the well produces the majority of the pressure needed to auto-ignite the air and fuel mixture. Only about 200 psi of water pressure is required to be generated with pumps at the ground surface 24. This reduces the footprint of the fracking site at the ground surface and also drastically reduces the amount of fuel needed for the pumps. Fewer pumps are required, less vehicles to move the pumps, less personnel to operate the equipment, and an overall lower economic expenditure.

Additionally, while inflatable packers are disclosed throughout, other packers are considered acceptable for use. For example, mechanical packers may be used for execution of the invention. One example of a mechanical packer is manufactured by World Oil Tools in Calgary, Alberta, Canada. These packers, or any other packer, may be used in the preferred embodiments.

Figure 14:
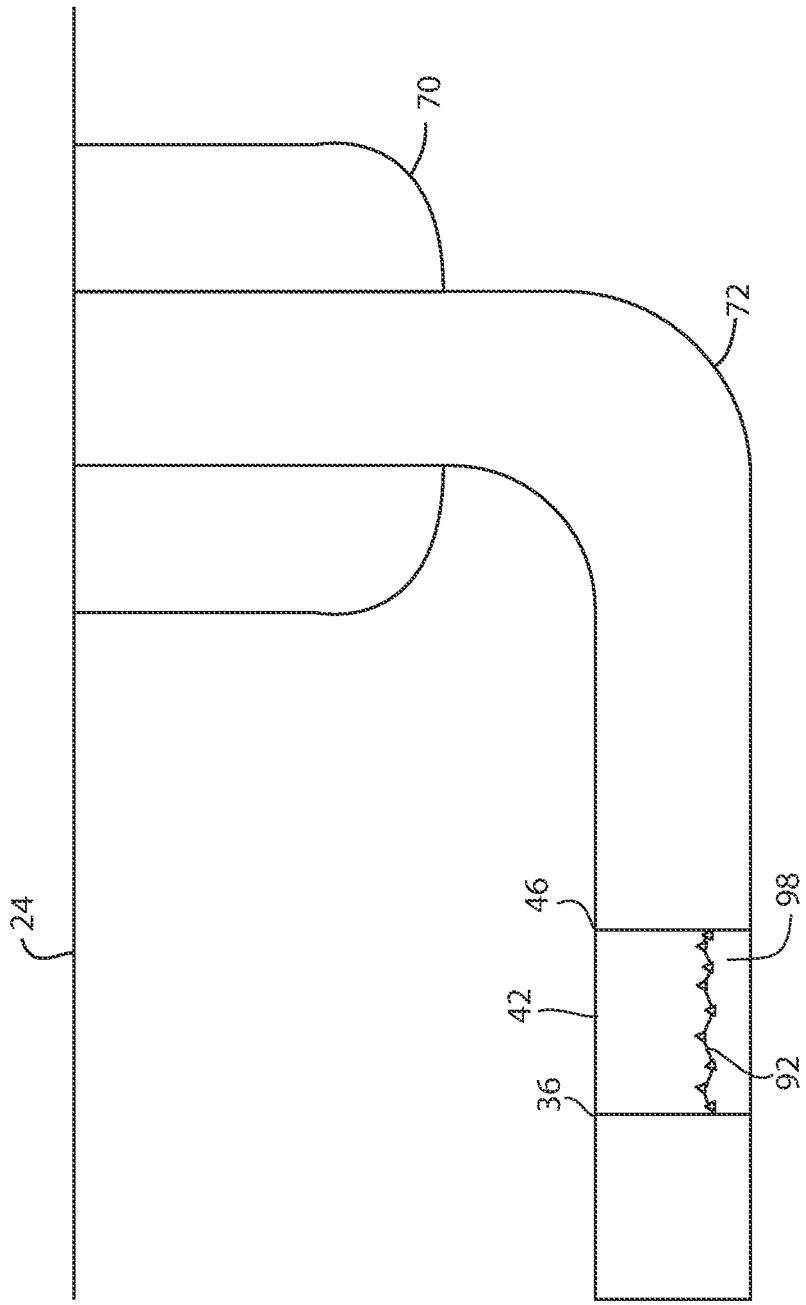
FIGS. 14 and 15 illustrate chronological schematic cross-sectional side views of a method of executing the fracking operation of a preferred embodiment using an emulsion mixture in a wet environment.
Figure 15:
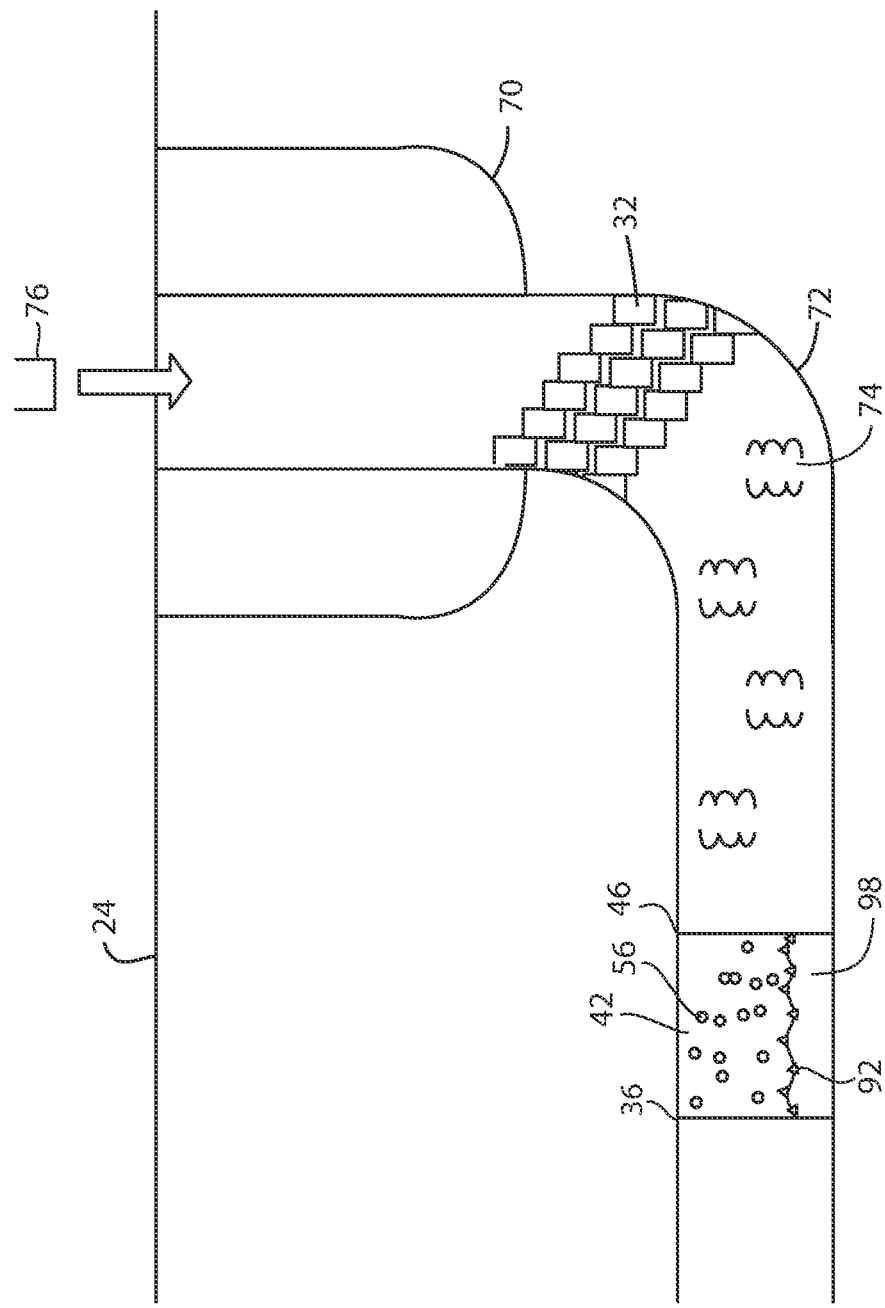
Figure 16:
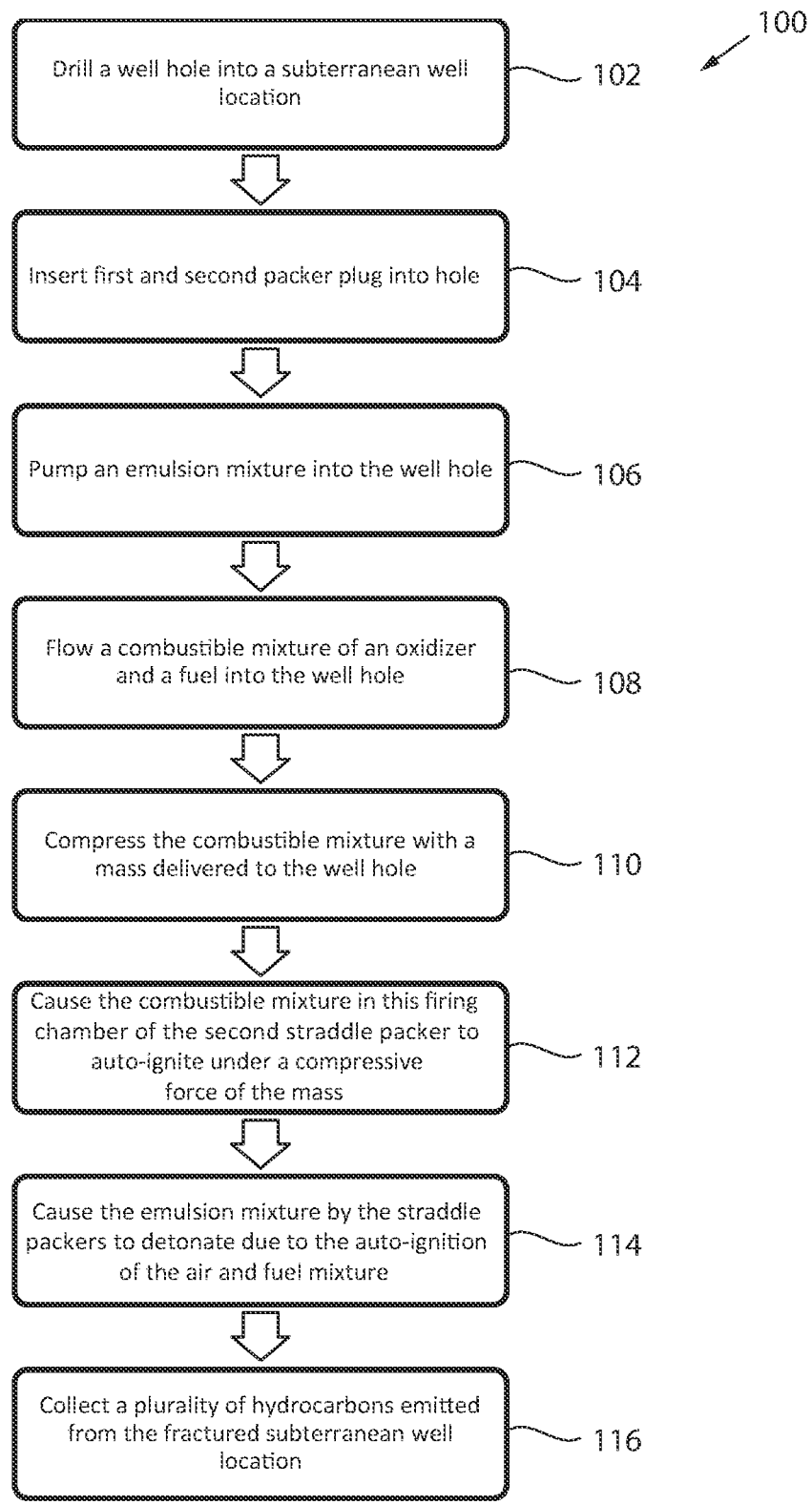
FIG. 16 illustrates the chronological steps required for recovering a hydrocarbon deposit from a wet subterranean environment using an emulsion mixture and an air and fuel mixture.

To address a common problem, an alternative embodiment is shown in FIGS. 14-16. In this case, the well 72 may generate large amounts of water 92 that complicates the process of auto-igniting the air and fuel mixture. When the air and fuel mixture mixes with water 92 present in the well, it creates an inactive paste. To address this issue, this alternative embodiment uses an emulsion mixture 98 that is first pumped down the well 72 into the compression chamber 42.

As shown in FIG. 14, the emulsion mixture 98 is pumped into the well hole toward the first packer plug 36. This emulsion mixture 98 will interact with any water 92 present in the hole but not mix within given that it includes an emulsifier having hydrophobic properties. The hydrophobic interaction between the emulsion mixture 98 and the water 92 prevents the water 92 from inactivating the air and fuel mixture 56 that is later pumped down the hole. Next, the second packer plug 46 is the inserted into the well hole 72, creating a pressure chamber 42 between the first packer plug 36 and the second packer plug 46.

Referring next to FIG. 15, once the emulsion mixture 98 has been pumped into the compression chamber 42 created between the first and second packer plugs 36, 46, the standard process of pumping an air and fuel mixture 56 down the well resumes. The ice pig 32 may then be placed into the well hole 72 to create a pressure barrier and prevent any fluid from rushing to the compression chamber 42. Next, water 76 may be introduced into the well hole 72. The ice pig 32 forms a pressure barrier and keeps the water 76 from filling the entire well hole 72. The ice pig 32 acts as a movable piston and compresses the space in the well hole building up pressure, shown as mixture 74. The pressure exerts a force against the compression chamber 42. Once the pressure exerted on the compression chamber 42 is great enough, the pressure causes the air and fuel mixture 56 to auto-detonate. This auto-detonation of the air and fuel mixture 56 causes the emulsion mixture 98 to detonate. The force from the auto-detonation of the air and fuel mixture 56 as well as the detonation of the emulsion mixture 98, causes the subterranean environment to fracture and release hydrocarbon deposits, which can then be collected. Notably, one particularly effective method for detonating the air and fuel mixture is to incorporate piezo crystals in the mixture. The piezo crystals respond to pressure to provide the spark to detonate the mixture. This approach can provide a more uniform detonation of the mixture, and ultimately the emulsion mixture/slurry.

Turning to FIG. 16 is a method 100 of extracting hydrocarbons from a subterranean environment using an emulsion mixture 98 as well as an air and fuel mixture 56, most useful for when a significant amount of water 92 is naturally present in the well. The method begins at step 102, where the operator drills a well hole 72 to a predetermined depth sufficient to reach a hydrocarbon deposit. At step 104, first and second packer plugs 36, 46 are inserted into the well hole 72, creating a pressure chamber 42 at a depth sufficient to reach hydrocarbon deposits. Next, at step 106, an emulsion mixture 98 is pumped into the well 72 to a depth sufficient to reach the hydrocarbon deposit. More particularly, the emulsion mixture 98 may interact with water 92 present, but due to the use of an emulsifier, the emulsion mixture 98 provides a water-resistant blasting agent. The emulsion mixture 98 is water-resistant because the ammonium nitrate is contained in small droplets surrounded by a hydrophobic mixture of fuels. The hydrophobic properties of the emulsion mixture 98 also prevent the inactivating interaction between the air and fuel mixture 56 and the water 92 present in the well hole 72.

Next, an air and fuel mixture 56 is pumped into the well 72 at step 108 to a depth sufficient to reach the hydrocarbon deposit. A liquid with a mass, such as water 76, is flowed into the well hole 72 at step 110, pressing against the packer plug 46 and causing pressure to build in the firing chamber of second straddle packer. The air and fuel mixture auto-detonates at step 112 from the pressure 74 of the liquid 38 pressing upon the firing chamber. At step 11, the emulsion mixture 98 in the compression chamber 42 detonates from the deflagration of the air and fuel mixture 56. The subterranean environment is fractured from the energy of the air and fuel mixture auto-detonation as well as the detonation of the emulsion mixture. At step 116, a plurality of hydrocarbons may be collected from the hydrocarbon deposit in the well hole 72.

There are virtually innumerable uses for the present apparatus and methods, all of which need not be detailed here. Additionally, all the disclosed embodiments can be practiced without undue experimentation. Further, although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept (as disclosed herein).

In addition, the individual components of the present invention discussed herein need not be fabricated from the disclosed materials, but could be fabricated from virtually any suitable materials. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A method of fracturing comprising:
   drilling a well hole into a subterranean well location;
   pumping an emulsion mixture into the well hole;
   flowing a combustible mixture of an oxidizer and a fuel into the well hole;
   compressing the combustible mixture with a mass of a mixture delivered to the well hole;
   causing the combustible mixture to auto-ignite under a compressive force of the mass, thereby causing the emulsion mixture to detonate due to the auto-ignition of the air and fuel mixture, wherein at least a portion of the subterranean well location is fractured with the explosion from the detonation of the emulsion mixture; and
   collecting a plurality of hydrocarbons emitted from the fractured subterranean well location.

2. The method of claim 1, wherein the mass of mixture is an aqueous mixture that is flowed into the well hole.

3. The method of claim 1, further comprising flowing a shocking mixture into the hole following the auto-ignition and detonation, providing additional fracturing by creating a steam and a thermal shock to the subterranean location.

4. The method of claim 1, wherein the emulsion mixture contains ammonium nitrate, oil, and a polymeric surfactant.

5. The method of claim 4, wherein the oil is at least one of fuel oil and mineral oil.

6. The method of claim 4, wherein the emulsion mixture is sensitized within a range of 3%-10%.

7. The method of claim 6, wherein the emulsion mixture is sensitized within a range of 5%-6%.

8. The method of claim 1, wherein the fuel is one of a group consisting of diesel fuel, a carbohydrate, wheat flour, corn flour, rice flour, barley flour, organic starches, powdered plastics, powdered coal, and powdered fecal matter.

9. The method of claim 1, wherein a plurality of piezo crystals is added to the fuel to provide detonation of the combustible mixture under pressure.

10. A system for fracturing a subterranean well location with a well hole comprising:
    A first packer plug, inserted into the well hole;
    a mass of an emulsion mixture, positioned atop the first packer plug, to interact with any water present in the well hole;
    a mass of a combustible mixture of an oxidizer and a fuel, positioned atop the first packer plug and the mass of the emulsion mixture;
    a second packer plug, inserted into the well enclosing the mass of the emulsion mixture and the mass of the combustible mixture of oxidizer and fuel;
    a mass of aqueous mixture;
    wherein the mass of aqueous mixture compresses the mass of combustible mixture to auto-detonate the mass of combustible mixture; and
    wherein the mass of the emulsion mixture is detonated by a deflagration of the mass of the combustible mixture.

11. The system of claim 10, wherein the emulsion mixture is one of a group including ammonium nitrate and at least one of a fuel oil, mineral oil, and a polymeric surfactant.

12. The system of claim 10, wherein the fuel is one of a group consisting of diesel fuel, a carbohydrate, wheat flour, corn flour, rice flour, barley flour, organic starches, powdered plastics, powdered coal, and powdered fecal matter.

13. The system of claim 12, wherein the fuel is diesel fuel and the diesel fuel is aerosolized and the oxidizer is at least one of aluminum nitrate, ammonium nitrate, and ambient air at a surface of the well hole.

14. The system of claim 10, wherein the oxidizer is at least one of aluminum nitrate, ammonium nitrate, or ambient air at a surface of the well hole.

15. The system of claim 10, wherein a plurality of piezo crystals is added to the fuel to provide detonation under pressure.

16. The system of claim 10, wherein the first packer plug includes a pressure reducing orifice.

17. A system to collect hydrocarbons from a subterranean environment comprising:
    a well hole extending a predetermined depth sufficient to reach a hydrocarbon deposit;
    a mixture pump that flows an emulsion mixture into the well hole to interact with any water present in the well hole;
    a compressor flowing an air and fuel mixture into the well hole;
    a fracking pump that flows an aqueous mixture into the well hole to apply pressure to the air and fuel mixture to auto-detonate the air and fuel mixture;
    wherein the emulsion mixture is detonated by the auto-detonation of the air and fuel mixture; and
    wherein the subterranean environment is fractured with the energy of the auto-detonation of the air and fuel mixture and the detonation of the emulsion mixture to allow recovery of a plurality of hydrocarbons in the hydrocarbon deposit from the well hole.

18. The system of claim 17, further comprising a first packer plug positioned at a distal end of the well hole and a second packer plug driven in to the well hole to compress the emulsion mixture and air and fuel mixture, wherein the weight of the aqueous mixture applies pressure to the second packer plug.

19. The system of claim 17, wherein the aqueous mixture is a mixture of liquid water and a gel made from at least one of guar and cross-linked polymers, and wherein the fuel is one of a group including diesel fuel, a carbohydrate, wheat flour, corn flour, rice flour, barley flour, organic starches, powdered plastics, powdered coal, and powdered fecal matter, and a plurality of piezo crystals.

20. The system of claim 17, wherein the air and fuel mixture includes an oxidizer, and the oxidizer is at least one of aluminum nitrate, ammonium nitrate, or ambient air at a surface of the well hole, and wherein a plurality of piezo crystals is added to the fuel to provide detonation of the air and fuel mixture under pressure.

* * * * *